(12) United States Patent
Streit

(10) Patent No.: US 11,138,333 B2
(45) Date of Patent: *Oct. 5, 2021

(54) SYSTEMS AND METHODS FOR PRIVACY-ENABLED BIOMETRIC PROCESSING

(71) Applicant: Private Identity LLC, Potomac, MD (US)

(72) Inventor: Scott Edward Streit, Woodbine, MD (US)

(73) Assignee: Private Identity LLC, Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/914,969

(22) Filed: Mar. 7, 2018

(65) Prior Publication Data

US 2019/0278937 A1    Sep. 12, 2019

(51) Int. Cl.
*G06F 21/62*    (2013.01)
*H04L 9/00*    (2006.01)
(Continued)

(52) U.S. Cl.
CPC .......... *G06F 21/6245* (2013.01); *G06F 21/32* (2013.01); *G06F 21/602* (2013.01);
(Continued)

(58) Field of Classification Search
CPC .... G06F 21/6245; G06F 21/32; G06F 21/602; G06K 9/6248; G06N 3/02; H04L 9/008; H04L 63/0428
See application file for complete search history.

(56) References Cited

U.S. PATENT DOCUMENTS 5,408,588 A    4/1995   Ulug
5,805,731 A    9/1998   Yaeger et al.
(Continued)

FOREIGN PATENT DOCUMENTS

EP    2784710    6/2018

OTHER PUBLICATIONS

International Search Report and Written Opinion dated Aug. 26, 2019 in connection with International Application No. PCT/US2019/021100.

(Continued)

*Primary Examiner* — Eleni A Shiferaw
*Assistant Examiner* — Stephanie S Ham
(74) *Attorney, Agent, or Firm* — Wolf, Greenfield & Sacks, P.C.

(57) ABSTRACT

In one embodiment, a set of feature vectors can be derived from any biometric data, and then using a deep neural network ("DNN") on those one-way homomorphic encryptions (i.e., each biometrics' feature vector) can determine matches or execute searches on encrypted data. Each biometrics' feature vector can then be stored and/or used in conjunction with respective classifications, for use in subsequent comparisons without fear of compromising the original biometric data. In various embodiments, the original biometric data is discarded responsive to generating the encrypted values. In another embodiment, the homomorphic encryption enables computations and comparisons on cypher text without decryption. This improves security over conventional approaches. Searching biometrics in the clear on any system, represents a significant security vulnerability. In various examples described herein, only the one-way encrypted biometric data is available on a given device. Various embodiments restrict execution to occur on encrypted biometrics for any matching or searching.

20 Claims, 13 Drawing Sheets

(51) Int. Cl.
    *G06F 21/32*    (2013.01)
    *G06N 3/02*     (2006.01)
    *H04L 29/06*    (2006.01)
    *G06F 21/60*    (2013.01)
    *G06K 9/62*     (2006.01)

(52) U.S. Cl.
    CPC .............. *G06K 9/6248* (2013.01); *G06N 3/02* (2013.01); *H04L 9/008* (2013.01); *H04L 63/0428* (2013.01)

(56) References Cited

U.S. PATENT DOCUMENTS

| | | | |
|---|---|---|---|
| 5,838,812 | A | 11/1998 | Pare, Jr. et al. |
| 6,480,621 | B1 | 11/2002 | Lyon |
| 6,944,319 | B1 | 9/2005 | Huang et al. |
| 7,278,025 | B2 | 10/2007 | Saito et al. |
| 8,281,148 | B2 | 10/2012 | Tuyls et al. |
| 8,856,541 | B1 | 10/2014 | Chaudhary et al. |
| 8,966,277 | B2 | 2/2015 | Rane et al. |
| 9,003,196 | B2 | 4/2015 | Hoyos et al. |
| 9,208,492 | B2 | 12/2015 | Hoyos |
| 9,313,200 | B2 | 4/2016 | Hoyos |
| 9,390,327 | B2 | 7/2016 | Gottemukkula et al. |
| 9,426,150 | B2 | 8/2016 | Stem et al. |
| 9,471,919 | B2 | 10/2016 | Hoyos et al. |
| 9,619,723 | B1 | 4/2017 | Chow et al. |
| 9,783,162 | B2 | 10/2017 | Hoyos et al. |
| 9,838,388 | B2 | 12/2017 | Mather et al. |
| 10,075,289 | B2 | 9/2018 | Laine et al. |
| 10,108,902 | B1 | 10/2018 | Lockett |
| 10,180,339 | B1 | 1/2019 | Long et al. |
| 10,419,221 | B1* | 9/2019 | Streit ................. H04L 9/3231 |
| 10,467,526 | B1 | 11/2019 | Appalaraju et al. |
| 10,491,373 | B2 | 11/2019 | Jain et al. |
| 10,499,069 | B2 | 12/2019 | Wang et al. |
| 10,721,070 | B2 | 7/2020 | Streit |
| 10,938,852 | B1 | 3/2021 | Streit |
| 2002/0049685 | A1 | 4/2002 | Yaginuma |
| 2002/0104027 | A1 | 8/2002 | Skerpac |
| 2005/0138110 | A1 | 6/2005 | Redlich et al. |
| 2005/0149442 | A1 | 7/2005 | Adams et al. |
| 2006/0228005 | A1 | 10/2006 | Matsugu et al. |
| 2007/0155366 | A1 | 7/2007 | Manohar et al. |
| 2007/0177773 | A1 | 8/2007 | Hu et al. |
| 2007/0220595 | A1 | 9/2007 | M'raihi et al. |
| 2007/0245152 | A1 | 10/2007 | Pizano et al. |
| 2008/0113785 | A1 | 5/2008 | Alderucci et al. |
| 2008/0113786 | A1* | 5/2008 | Alderucci ............. G07F 17/323 463/29 |
| 2008/0247611 | A1 | 10/2008 | Aisaka et al. |
| 2009/0034803 | A1 | 2/2009 | Matos |
| 2010/0131273 | A1 | 5/2010 | Aley-Raz et al. |
| 2010/0162386 | A1 | 6/2010 | Li et al. |
| 2010/0180127 | A1 | 7/2010 | Li et al. |
| 2011/0026781 | A1 | 2/2011 | Osadchy et al. |
| 2012/0195475 | A1 | 8/2012 | Abiko |
| 2013/0080166 | A1 | 3/2013 | Buffum et al. |
| 2013/0148868 | A1 | 6/2013 | Pastoriza et al. |
| 2013/0166296 | A1 | 6/2013 | Scheffer |
| 2013/0212049 | A1 | 8/2013 | Maldonado |
| 2013/0307670 | A1 | 11/2013 | Ramaci |
| 2013/0318351 | A1* | 11/2013 | Hirano ................. H04L 9/3073 713/168 |
| 2014/0283061 | A1 | 9/2014 | Quinlan et al. |
| 2014/0304505 | A1 | 10/2014 | Dawson |
| 2014/0331059 | A1 | 11/2014 | Rane et al. |
| 2014/0337930 | A1 | 11/2014 | Hoyos et al. |
| 2015/0170053 | A1 | 6/2015 | Miao |
| 2015/0310444 | A1 | 10/2015 | Chen et al. |
| 2015/0347820 | A1 | 12/2015 | Yin et al. |
| 2016/0078485 | A1 | 3/2016 | Shim et al. |
| 2016/0127359 | A1 | 5/2016 | Minter et al. |
| 2016/0140438 | A1 | 5/2016 | Yang et al. |
| 2016/0164682 | A1* | 6/2016 | Hartloff ................. H04L 9/3231 713/186 |
| 2016/0350648 | A1 | 12/2016 | Gilad-Bachrach et al. |
| 2016/0371438 | A1 | 12/2016 | Annulis |
| 2016/0373440 | A1* | 12/2016 | Mather ................. H04L 63/0861 |
| 2016/0379041 | A1 | 12/2016 | Rhee et al. |
| 2016/0379044 | A1 | 12/2016 | Tang et al. |
| 2017/0008168 | A1 | 1/2017 | Weng et al. |
| 2017/0046563 | A1 | 2/2017 | Kim et al. |
| 2017/0093851 | A1 | 3/2017 | Allen |
| 2017/0098140 | A1 | 4/2017 | Wang et al. |
| 2017/0126672 | A1 | 5/2017 | Jang |
| 2017/0132526 | A1 | 5/2017 | Cohen et al. |
| 2017/0169331 | A1 | 6/2017 | Garner |
| 2017/0289168 | A1 | 10/2017 | Bar et al. |
| 2017/0357890 | A1 | 12/2017 | Kim et al. |
| 2018/0018451 | A1* | 1/2018 | Spizhevoy ......... G06K 9/00617 |
| 2018/0025243 | A1 | 1/2018 | Chandraker et al. |
| 2018/0060552 | A1 | 3/2018 | Pellom et al. |
| 2018/0082172 | A1 | 3/2018 | Patel et al. |
| 2018/0137395 | A1 | 5/2018 | Han et al. |
| 2018/0139054 | A1 | 5/2018 | Chu et al. |
| 2018/0173861 | A1 | 6/2018 | Guidotti et al. |
| 2018/0173980 | A1 | 6/2018 | Fan et al. |
| 2018/0276488 | A1 | 9/2018 | Yoo et al. |
| 2018/0293429 | A1 | 10/2018 | Wechsler et al. |
| 2018/0330179 | A1 | 11/2018 | Streit |
| 2018/0336472 | A1 | 11/2018 | Ravi |
| 2018/0373979 | A1 | 12/2018 | Wang et al. |
| 2019/0005126 | A1 | 1/2019 | Chen et al. |
| 2019/0019061 | A1 | 1/2019 | Trenholm et al. |
| 2019/0020482 | A1 | 1/2019 | Gupta et al. |
| 2019/0042895 | A1 | 2/2019 | Liang et al. |
| 2019/0044723 | A1 | 2/2019 | Prakash et al. |
| 2019/0080475 | A1 | 3/2019 | Ma et al. |
| 2019/0132344 | A1 | 5/2019 | Lem et al. |
| 2019/0147305 | A1 | 5/2019 | Lu et al. |
| 2019/0147434 | A1 | 5/2019 | Leung |
| 2019/0171908 | A1 | 6/2019 | Salavon |
| 2019/0180090 | A1 | 6/2019 | Jiang et al. |
| 2019/0197331 | A1 | 6/2019 | Kwak et al. |
| 2019/0205620 | A1 | 7/2019 | Yi et al. |
| 2019/0215551 | A1 | 7/2019 | Modarresi et al. |
| 2019/0236273 | A1 | 8/2019 | Saxe et al. |
| 2019/0244138 | A1 | 8/2019 | Bhowmick et al. |
| 2019/0253431 | A1 | 8/2019 | Atanda |
| 2019/0278895 | A1* | 9/2019 | Streit ................. G06F 21/602 |
| 2019/0279047 | A1 | 9/2019 | Streit |
| 2019/0280868 | A1 | 9/2019 | Streit |
| 2019/0280869 | A1 | 9/2019 | Streit |
| 2019/0286950 | A1 | 9/2019 | Kiapour et al. |
| 2019/0294973 | A1 | 9/2019 | Kannan et al. |
| 2019/0306731 | A1 | 10/2019 | Raghuramu et al. |
| 2019/0318261 | A1 | 10/2019 | Deng et al. |
| 2019/0347432 | A1 | 11/2019 | Boivie |
| 2019/0354806 | A1 | 11/2019 | Chhabra |
| 2019/0372754 | A1 | 12/2019 | Gou et al. |
| 2019/0372947 | A1 | 12/2019 | Penar et al. |
| 2020/0004939 | A1 | 1/2020 | Streit |
| 2020/0007931 | A1 | 1/2020 | Ho et al. |
| 2020/0014541 | A1 | 1/2020 | Streit |
| 2020/0044852 | A1 | 2/2020 | Streit |
| 2020/0097653 | A1 | 3/2020 | Mehta et al. |
| 2020/0099508 | A1 | 3/2020 | Ghorbani |
| 2020/0228336 | A1 | 7/2020 | Streit |
| 2020/0228339 | A1 | 7/2020 | Barham et al. |
| 2020/0351097 | A1 | 11/2020 | Streit |
| 2020/0365143 | A1 | 11/2020 | Ogawa et al. |

OTHER PUBLICATIONS

International Search Report and Written Opinion dated Sep. 30, 2019 in connection with International Application No. PCT/US2019/039537.

Al-Waisy et al., A Multimodal Biometric System for Personal Identification Based on Deep Learning Approaches.2017 Seventh International Conference on Emerging Security Technologies (EST). 2017 IEEE. 2017; pp. 162-168.

(56) References Cited

OTHER PUBLICATIONS

Invitation to Pay Additional Fees dated Jun. 24, 2019 in connection with International Application No. PCT/US2019/021100.
Chen et al., Learning Multi-channel Deep Feature Representations for Face Recognition. JMLT: Workshop and Conference Proceedings. 2015:44;60-71.
Streit et al., Privacy Enabled Biometric Search. ArXiv e-prints. Aug. 16, 2017. 7 pages.
U.S. Appl. No. 15/914,436, filed Mar. 7, 2018, Streit.
U.S. Appl. No. 15/914,562, filed Mar. 7, 2018, Streit.
U.S. Appl. No. 15/914,942, filed Mar. 7, 2018, Streit.
U.S. Appl. No. 16/218,139, filed Dec. 12, 2018, Streit.
PCT/US2019/021100, Jun. 24, 2019, Invitation to Pay Additional Fees.
International Preliminary Report on Patentability dateed Sep. 17, 2020 in connection with International Application No. PCT/US2019/021100.
U.S. Appl. No. 16/832,014, filed Mar. 27, 2020, Streit.
Kurban et al., A Multi-Biometric Recognition System Based on Deep Features of Face and Gesture Energy Image. 2017 IEEE International Conference on Innovations in Intelligent. Systems and Applications. 2017; 4 pages. https://ieeexplore.ieee.org/stamp/stamp.jsp?tp=&arnumber=8001186.
Lu et al., Discriminative Deep Metric Learning for Face and Kinship Verification. IEEE Transactions on Image Processing. 2017; 26 (9): 4269-4282.
Stuhlsatz et al., Feature Extraction with Deep Neural Networks by a Generalized Discriminant Analysis. IEEE Transactions on Neural Networks and Learning Systems. Apr. 2012; 23(4): 596-608.
Zhang et al., Face Detection Based on Multi Task Learning and Multi Layer Feature Fusion. 2017 6th International Conference on Computer Science and Network Technology (ICCSNT). 2017: 289-293.
Graepel et al. ML Confidential: Machine Learning on Encrypted Data. SpringerOVeralg Berlin Heidelberg. 2013, pp. 1-21.
Xie et al. Crypto-Nets: Neural Networks over Encrypted data. ICLR. 2014; pp. 1-9.
International Search Report and Written Opinion dated Oct. 29, 2020 in connection with International Application No. PCT/US2020/046061.
Invitation to Pay Additional Fees dated Dec. 3, 2020 in connection with International Application No. PCT/US2020/050935.
International Preliminary Report on Patentability dated Jan. 7, 2021 in connection with International Application No. PCT/US2019/039537.
Ma et al., A Secure Face-Verification Scheme Based on Homomorphic Encryption and Deep Neural Networks. IEEE. Sep. 6, 2017: 5:16532-16538.
International Search Report and Written Opinion dated Feb. 3, 2021 in connection with International Application No. PCT/US2020/050935.
U.S. Appl. No. 17/155,890, filed Jan. 22, 2021, Streit.
U.S. Appl. No. 17/183,950, filed Feb. 24, 2021, Streit.
PCT/US2020/050935, Feb. 3, 2021, International Search Report and Written Opinion.
U.S. Appl. No. 16/993,596, filed Aug. 14, 2020, Streit.
PCT/US2019/039537, Jan. 7, 2021, International Preliminary Report on Patentability.
PCT/US2020/046061, Oct. 29, 2020, International Search Report and Written Opinion.
PCT/US2020/050935, Dec. 3, 2020, Invitation to Pay Additional Fees.

* cited by examiner

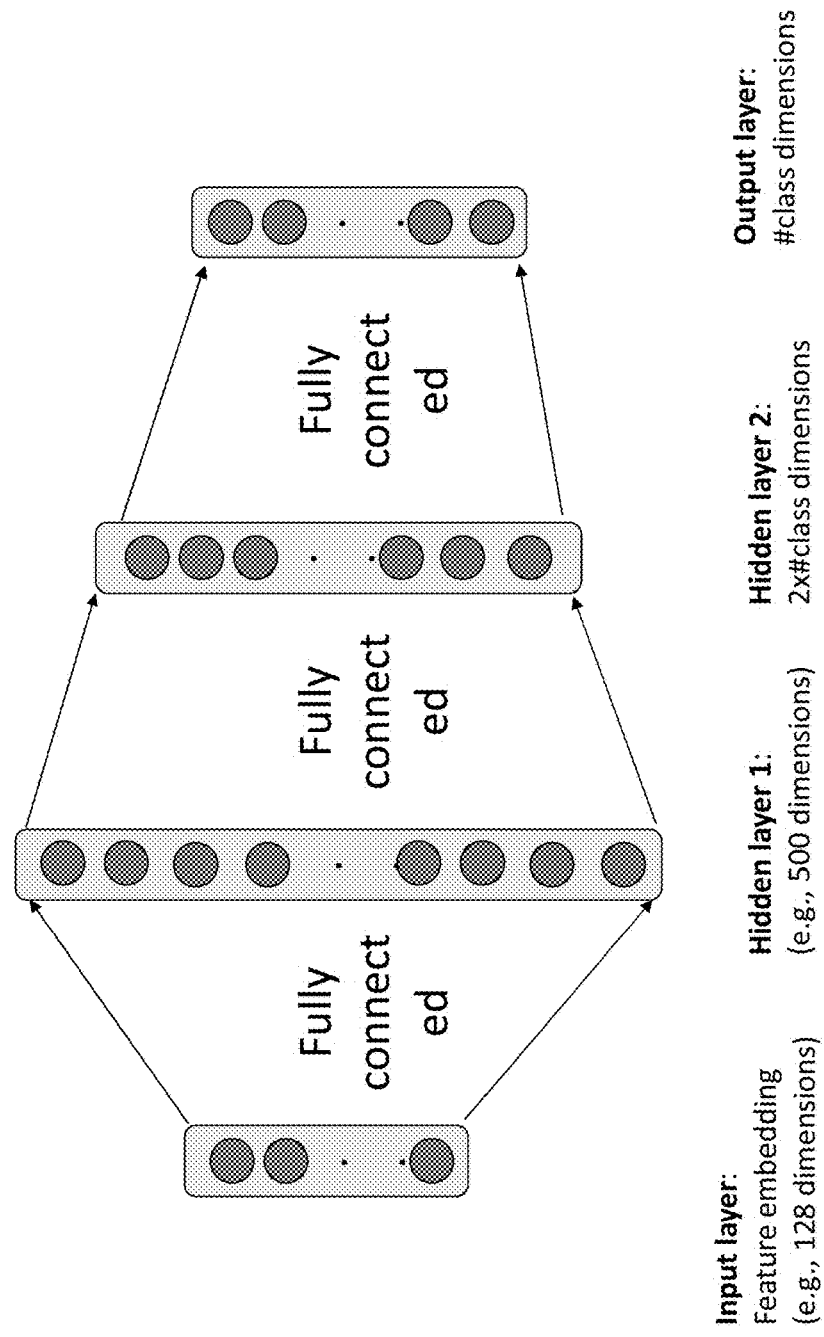

| Description | Statistics | Visualization |
|---|---|---|
| "data" Activation | Data shape: [ 3 128 128 ]<br>Mean: 10.736<br>Std deviation: 62.0999 | |

FIG. 5B

"conv1a"
Activation

"fc7-conv"
Activation

Data shape: [256 1 1]
Mean: 2.09114
Std deviation: 2.89049

"softmax"
Activation

Data shape: [15 1 1]
Mean: 0.0666667
Std deviation: 0.249444

SYSTEMS AND METHODS FOR PRIVACY-ENABLED BIOMETRIC PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Biometrics offer the opportunity for identity assurance and identity validation. Many conventional uses for biometrics currently exist for identity and validation. These conventional approaches suffer from many flaws. For example, the IPHONE facial recognition service limits implementation to a one to one match. This limitation is due to the inability to perform one to many searching on the biometric, let alone on a secure encrypted biometric. In fact, most conventional approaches search or match biometrics using unencrypted information, and attempt to perform the search in secure computing spaces to avoid compromise of the biometrics.

SUMMARY

It is realized that there is a need for a solution that provides one to many searching, and that provides for operations on encrypted biometric information. There is a further need to establish such searches that accomplish one to many matching in polynomial time. Various embodiments of the privacy-enabled biometric system provide for scanning of multiple biometrics to determine matches or closeness. Further embodiments can provide for search and matching across multiple types of encrypted biometric information improving accuracy of validation over many conventional approaches, while improving the security over the same approaches.

According to another aspect, conventional approaches are significantly burdened not only in biometric data that is to be searched in the clear but also by key management overhead that is needed for securing those biometrics in storage. Using APPLE as an example, a secure enclave is provided on the IPHONE with encryption keys only available to the secure enclave such that facial biometrics never leave a respective device or the secure enclave. Various embodiments described herein completely change this paradigm by fully encrypting the reference biometric, and executing comparisons on the encrypted biometrics (e.g., encrypted feature vectors of the biometric).

According to one embodiment, a set of feature vectors can be derived from any biometric data, and then using a deep neural network ("DNN") on those one-way homomorphic encryptions (i.e., each biometrics' feature vector) a system can determine matches or execute searches on the encrypted data. Each biometrics' feature vector can then be stored and/or used in conjunction with respective classifications, for use in subsequent comparisons without fear of compromising the original biometric data. In various embodiments, the original biometric data is discarded responsive to generating the encrypted values.

According to one embodiment, the homomorphic encryption enables computations and comparisons on cypher text without decryption. This improves security over conventional approaches. Searching biometrics in the clear on any system, represents a significant security vulnerability. In various examples described herein, only the one-way encrypted biometric data is available on a given device. Various embodiments restrict execution to occur on encrypted biometrics for any matching or searching.

According to another aspect, encrypted search can be executed on the system in polynomial time, even in a one to many use case. This feature enables scalability that conventional systems cannot perform and enables security/privacy unavailable in many conventional approaches.

According to one aspect a privacy-enabled biometric system is provided. The system comprises at least one processor operatively connected to a memory; a classification component executed by the at least one processor, comprising a classification network having a deep neural network ("DNN") configured to classify feature vector inputs during training and return a label for person identification or an unknown result during prediction; and the classification component is further configured to accept as an input feature vectors that are Euclidean measurable and return the unknown result or the label as output.

According to one embodiment, a set of biometric feature vectors is used for training in the DNN neural network for subsequent prediction. According to one embodiment, biometrics are morphed a finite number of times to create additional biometrics for training of the second (classification) neural network. The second neural network is loaded with the label and a finite number of feature vectors based on an input biometric. According to one embodiment, the classification component is configured to accept or extract from another neural network Euclidean measurable feature vectors. According to one embodiment, the another neural network comprises a pre-trained neural network. According to one embodiment, this network takes in a plaintext biometric and returns a Euclidean measurable feature vector that represents a one-way encrypted biometric. According to one embodiment, the classification neural network comprises a classification based deep neural network configured for dynamic training with label and feature vector input pairs to training. According to one embodiment, a feature vector is input for prediction.

According to one embodiment, the system further comprises a preprocessing component configured to validate plaintext biometric input. According to one embodiment, only valid images are used for subsequent training after the preprocessing. According to one embodiment, the classification component is configured with a plurality of modes of execution, including an enrollment mode configured to accept, as input, a label and feature vectors on which to train the classification network for subsequent prediction. According to one embodiment, the classification component is configured to predict a match, based on a feature vector as input, to an existing label or to return an unknown result. According to one embodiment, the classification component is configured to incrementally update an existing model, maintaining the network architecture and accommodating the unknown result for subsequent predictions. According to one embodiment, wherein the system is configured to analyze the output values and based on their position and the values, determine the label or unknown.

According to one embodiment, the classification network further comprises an input layer for accepting feature vectors of a number of dimensions, the input layer having a number of classes at least equal to the number of dimensions of the feature vector input, first and a second hidden layers, and an output layer that generates an array of values. According to one embodiment, the fully connected neural network further comprises an input layer for accepting feature vectors of a number of dimensions, the input layer having a number of nodes at least equal to the number of dimensions of the feature vector input, a first hidden layer of at least 500 dimensions, a second hidden layer of at least twice the number of input dimensions, and an output layer that generates an array of values that based on their position and the values, determine the label or unknown. According to one embodiment, a set of biometric feature vectors is used for training the DNN neural network for subsequent prediction.

According to one aspect a computer implemented method for executing privacy-enabled biometric training is provided. The method comprises instantiating, by at least one processor, a classification component comprising classification network having a deep neural network ("DNN") configured to classify feature vector inputs during training and return a label for person identification or an unknown result during prediction; accepting, by the classification component, as an input feature vectors that are Euclidean measurable and a label for training the classification network; and Euclidean measurable feature vectors for prediction functions with the classification network; and classifying, by a classification component executed on at least one processor, the feature vector inputs and the label during training.

According to one embodiment, the method further comprises accepting or extracting, by the classification component, from another neural network the Euclidean measurable feature vectors. According to one embodiment, the another neural network comprises a pre-trained neural network. According to one embodiment, the classification neural network comprises a classification based deep neural network configured for dynamic training with label and feature vector input pairs. According to one embodiment, the method further comprises an act of validating input biometrics used to generate a feature vector. According to one embodiment, the method further comprises an act of triggering a respective one of a plurality of modes of operation, including an enrollment mode configured to accept a label and feature vectors for an individual. According to one embodiment, the method further comprises an act of predicting a match to an existing label or returning an unknown result responsive to accepting a biometric feature vector as input.

According to one embodiment, method further comprises an act of updating the classification network with respective vectors for use in subsequent predictions. To handle the case of a person's looks changing over time, the input for prediction, may be used to re-train the individual. According to one embodiment, the method further comprises an act of updating, incrementally, an existing node in the classification network and maintaining the network architecture to accommodate the feature vector for subsequent predictions. According to one embodiment, the classification network further comprises an input layer for accepting feature vectors of a number of dimensions, the input layer having a number of nodes at least equal to the number of dimensions of the feature vector input, a first and second hidden layer and an output layer that generates an array of values.

According to one aspect a non-transitory computer readable medium containing instructions when executed by at least one processor cause a computer system to execute a method for executing privacy-enabled biometric analysis, the method is provided. A method comprises an instantiating, a classification component comprising a classification network having a deep neural network ("DNN") configured to classify feature vector and label inputs during training and return a label for person identification or an unknown result during prediction; accepting, by the classification component, as an input feature vectors that are Euclidean measurable as an input and a label for training the classification network, and Euclidean measurable feature vectors for prediction functions with the classification network; and classifying, by a classification component executed on at least one processor, the feature vector inputs and the label during training.

According to one embodiment, the method further comprises an act of accepting or extracting, by the classification component, from another neural network Euclidean measurable feature vectors. According to one embodiment, the another neural network comprises a pre-trained neural network. According to various embodiments, the computer readable medium contains instructions to perform any of the method steps above, individually, in combination, or in any combination.

According to one aspect a privacy-enabled biometric system is provided. The system comprises a classification means comprising a classifying deep neural network ("DNN") executed by at least one processor the FCNN configured to: classify feature vector inputs and return a label for person identification or an unknown result as a prediction; and accept as an input, feature vectors that are Euclidean measurable and a label as an instance of training.

According to one aspect, a privacy-enabled biometric system is provided. The system comprises at least one processor operatively connected to a memory; a classification component executed by the at least one processor, including a classification network having a deep neural network ("DNN") configured to classify feature vector inputs during training and return a label for person identification or an unknown result during prediction, wherein the classification component is further configured to accept as an input feature vectors that are Euclidean measurable; a feature vector generation component comprising a pre-trained neural network configured to generate Euclidean measurable feature vectors as an output of a least one layer in the neural network responsive to input of an unencrypted biometric input.

According to one embodiment, the classification component is further configured to accept one way homomorphic, Euclidean measurable vectors, and labels for person identification as input for training. According to one embodiment, the classification component is configured to accept or extract from the pre-trained neural network the feature vectors. According to one embodiment, the pre-trained neural network includes an output generation layer which provides Euclidean Measurable feature vectors. According to one embodiment, the classification network comprises a deep neural network suitable for training and, for prediction, output of a list of values allowing the selection of labels or unknown as output. According to one embodiment, the pre-trained network generates feature vectors on a first biometric type (e.g., image, voice, health data, iris, etc.); and the classification component is further configured to accept feature vectors from a another neural network that generates Euclidean measurable feature vectors on a another biometric type.

According to one embodiment, the system is configured to instantiate multiple classification networks each associated with at least one different biometric type relative to another classification network, and classify input feature vectors based on executing at least a first or second classification network. According to one embodiment, the system is configured to execute a voting procedure to increase accuracy of identification based on multiple biometric inputs or multiple types of biometric input. According to one embodiment, the system is configured to maintain at least an executing copy of the classifying network and an updatable copy of classification network that can be locked or put in an offline state to enable retraining operations while the executing copy of the classifying network handles any classification requests. According to one embodiment, the classification component is configured with a plurality of modes of execution, including an enrollment mode configured to accept a label for identification and the input feature vectors for an individual from the feature vector generation component.

According to one embodiment, the classification component is configured to predict a match to an existing label or to return an unknown result based on feature vectors enrolled in the classification network. According to one embodiment, the classification component is configured to incrementally update an existing node in the neural network maintaining the network architecture and accommodating the unknown result for subsequent predictions. According to one embodiment, the classification network further comprises an input layer for accepting feature vectors of a number of dimensions, the input layer having a number of nodes at least equal to the number of dimensions of the feature vector input, a first hidden layer, a second hidden layer, and an output layer that generates that generates an array of values that based on their position and the values, determine the label or unknown. According to one embodiment, the classification network further comprises a plurality of layers including two hidden layers and an output layer having a number of nodes at least equal to the number of dimensions of the feature vector input.

According to one aspect a computer implemented method for executing privacy-enabled biometric analysis, the method is provided. The method further comprises instantiating, by at least one processor, a classification component comprising a deep neural network ("DNN") configured to classify feature vector inputs during training and return a label for person identification or an unknown result during prediction, and a feature vector generation component comprising a pre-trained neural network; generating, by the feature vector generation component Euclidean measurable feature vectors as an output of a least one layer in the pre-trained neural network responsive to input of an unencrypted biometric input; accepting, by the classification component, as an input feature vectors that are Euclidean measurable generated by the feature vector generation component and a label for training the classification network, and Euclidean measurable feature vectors for prediction functions with the classification network; and classifying, by a classification component executed on at least one processor, the feature vector inputs and the label during training.

According to one embodiment, the method further comprises accepting or extracting, by the classification network the Euclidean measurable feature vectors from the pre-trained neural network. According to one embodiment, the second neural network comprises a pre-trained neural network. According to one embodiment, the method further comprises an act of validating input feature vectors as Euclidean measurable. According to one embodiment, the method further comprises generating, by the classification component feature vectors on a first biometric type (e.g., image, voice, health data, iris, etc.); and accepting, by the classification component, feature vectors from another neural network that generates Euclidean measurable feature vectors on a second biometric type.

According to one embodiment, method further comprises: instantiating multiple classification networks each associated with at least one different biometric type relative to another classification network, and classifying input feature vectors based on applying at least a first or second classification network. According to one embodiment, the method further comprises executing a voting procedure to increase accuracy of identification based on multiple biometric inputs or multiple types of biometric input and respective classifications. According to one embodiment, for a biometric to be considered a match, it must receive a plurality of votes based on a plurality of biometrics. According to one embodiment, the method further comprises instantiating multiple copies of the classification network to enable at least an executing copy of the classification network, and an updatable classification network that can be locked or put in an offline state to enable retraining operations while the executing copy of the classification network handles any classification requests. According to one embodiment, the method further comprises predicting a match to an existing label or to return an unknown result based, at least in part, on feature vectors enrolled in the classification network. According to one embodiment, the method further comprises updating, incrementally, an existing model in the classification network maintaining the network architecture and accommodating the unknown result for subsequent predictions.

According to one aspect a non-transitory computer readable medium containing instructions when executed by at least one processor cause a computer system to execute a method for executing privacy-enabled biometric analysis, the method is provided. The method comprises instantiating a classification component comprising a deep neural network ("DNN") configured to classify feature vector and label inputs during training and return a label for person identification or an unknown result during prediction, and a feature vector generation component comprising a pre-trained neural network; generating, by the feature vector generation component Euclidean measurable feature vectors as an output of a least one layer in the pre-trained neural network responsive to input of an unencrypted biometric input; accepting, by the classification component, as an input feature vectors that are Euclidean measurable generated by the feature vector generation component and a label for training the classification network, and Euclidean measurable feature vectors for prediction functions with the classification network; and classifying, by a classification component executed on at least one processor, the feature vector inputs and the label during training. According to various embodiments, the computer readable medium contains instructions to perform any of the method steps above, individually, in combination, or in any combination.

According to one aspect a privacy-enabled biometric system is provided. The system comprises a feature vector generation means comprising a pre-trained neural network configured to generate Euclidean measurable feature vectors responsive to an unencrypted biometric input; a classification means comprising a deep neural network ("DNN") configured to: classify feature vector and label inputs and return a label for person identification or an unknown result for training; and accept feature vectors that are Euclidean measurable as inputs and return a label for person identification or an unknown result for prediction.

According to one aspect a privacy-enabled biometric system is provided. The system comprises at least one processor operatively connected to a memory; a classification component executed by the at least one processor, including a classification network having a deep neural network ("DNN") configured to classify feature vector and label inputs during training and return a label for person identification or an unknown result during prediction, wherein the classification component is further configured to accept as an input feature vectors that are Euclidean measurable; the classification network having an architecture comprising a plurality of layers: at least one layer comprising nodes associated with feature vectors, the at least one layer having an initial number of identification nodes and a subset of the identification nodes that are unassigned; the system responsive to input of biometric information for a new user is configured to trigger an incremental training operation for the classification network integrating the new biometric information into a respective one of the unallocated identification nodes usable for subsequent matching.

According to one embodiment, the system is configured to monitor allocation of the unallocated identification nodes and trigger a full retraining of the classification network responsive to assignment of the subset of unallocated nodes. According to one embodiment, the system is configured to execute a full retraining of the classification network to include additional unallocated identification nodes for subsequent incremental retraining of the DNN. According to one embodiment, the system iteratively fully retrains the classification network upon depletion of unallocated identification nodes with additional unallocated nodes for subsequent incremental training. According to one embodiment, the system is further configured to monitor matching of new biometric information to existing identification nodes in the classification network.

According to one embodiment, the system is further configured trigger integration of new biometric information into existing identification nodes responsive to exceeding a threshold associated with matching new biometric information. According to one embodiment, the pre-trained network is further configured to generate one way homomorphic, Euclidean measurable, feature vectors for the individual. According to one embodiment, the classification component is further configured to return a set of probabilities for matching a set of existing labels. According to one embodiment, the classification component is further configured to predict an outcome based on a trained model, a set of inputs for the prediction and a result of a class or unknown (all returned values dictating UNKNOWN).

According to one embodiment, the classification component is further configured to accept the feature vector inputs from a neural network model that generates Euclidean measurable feature vectors. According to one embodiment, the classification component is further configured to extract the feature vectors from the neural network model from layers in the model. According to one embodiment, the system further comprising a feature vector component executed by the at least one processor comprising a neural network. According to one embodiment, the feature vector component is configured to extract the feature vectors during execution of the neural network from layers. According to one embodiment, the neural network comprises of a set of layers wherein one layer outputs Euclidean Measurable Feature Vectors. According to one embodiment, the system further comprising a retraining component configured to monitor a number of new input feature vectors or matches of new biometric information to a label and trigger retraining by the classification component on the new biometric information for the label. This can be additional training on a person, using predict biometrics, that continues training as a biometric changes over time. The system may be configured to do this based on a certain number of consecutive predictions or may do it chronologically, say once every six months.

According to one embodiment, the classification component is configured to retrain the neural network on addition of new feature vectors. According to one embodiment, the neural network is initially trained with unallocated people classifications, and the classification component is further configured to incrementally retrain the neural network to accommodate new people using the unallocated classifications. According to one embodiment, the system further comprises a retraining component configured to: monitor a number of incremental retraining; trigger the classifier component to fully retrain the neural network responsive to allocation of the unallocated classifications. According to one embodiment, the classification component is configured to fully retrain the neural network to incorporate unallocated people classifications, and incrementally retrain for new people using the unallocated classifications. According to one embodiment, the classification component further comprises multiple neural networks for processing respective types of biometric information. According to one embodiment, the classification component is further configured to generate an identity of a person responsive to at least two probable biometric indicators that may be used simultaneously or as part of a "voting" algorithm.

According to one aspect a computer implemented method for privacy-enabled biometric analysis is provided. The method comprises instantiating, by at least one processor, a classification component comprising a classification network having a deep neural network ("DNN") configured to classify feature vector and label inputs during training and return a label for person identification or an unknown result during prediction, and wherein the classification component is further configured to accept as an input feature vectors that are Euclidean measurable and return the unknown result or the label as output; instantiating the classification component includes an act of allocating within at least one layer of the classification network, an initial number of classes and having a subset of the class slots that are unassigned; triggering responsive to input of biometric information for a new user incremental training operation for the classification network integrating the new biometric information into a respective one of the unallocated class slots usable for subsequent matching.

According to one embodiment, the method further comprises acts of accepting, by the classification component, as an input feature vectors that are Euclidean measurable generated by a feature vector generation component; classifying, by the classification component executed on at least one processor, the feature vector inputs; and returning, by the classification component, a label for person identification or an unknown result. According to one embodiment, the method further comprises acts of instantiating a feature vector generation component comprising a pre-trained neural network; and generating, by the feature vector generation component Euclidean measurable feature vectors as an output of a least one layer in the pre-trained neural network responsive to input of an unencrypted biometric input. According to one embodiment, the method further comprises an act of monitoring, by the at least one processor, allocation of the unallocated identification classes and triggering an incremental retraining of the classification network responsive to assignment of the subset of unallocated nodes to provide additional unallocated classes.

According to one embodiment, the method further comprises an act of monitoring, by the at least one processor, allocation of the unallocated identification nodes and triggering a full retraining or incremental of the classification network responsive to assignment of the subset of unallocated nodes. According to one embodiment, the method further comprises an act of executing a full retraining of the classification network to include additional unallocated classes for subsequent incremental retraining of the DNN. According to one embodiment, the method further comprises an act of fully retraining the classification network iteratively upon depletion of unallocated identification nodes, the full retraining including an act of allocating additional unallocated nodes for subsequent incremental training. According to one embodiment, the method further comprises an act of monitoring matching of new biometric information to existing identification nodes. According to one embodiment, the method further comprises an act of triggering integration of new biometric information into existing identification nodes responsive to exceeding a threshold associated with matching new biometric information. According to one embodiment, the method further comprises an act of generating one way homomorphic, Euclidean measurable, labels for person identification responsive to input of Euclidean measurable feature vectors for the individual by the classification component.

According to one aspect a non-transitory computer readable medium containing instructions when executed by at least one processor cause a computer system to execute a method instantiating a classification component comprising a classification network having a deep neural network ("DNN") configured to classify feature vector and label inputs during training and return a label for person identification or an unknown result during prediction, and wherein the classification component is further configured to accept as an input feature vectors that are Euclidean measurable and return the unknown result or the label as output; instantiating the classification component includes an act of allocating within at least one layer of the classification network, an initial number of classes and having a subset of additional classes that are unassigned; triggering responsive to input of biometric information for a new user incremental training operation for the classification network integrating the new biometric information into a respective one of the unallocated identification nodes usable for subsequent matching. According to various embodiments, the computer readable medium contains instructions to perform any of the method steps above, individually, in combination, or in any combination.

According to one aspect a privacy-enabled biometric system is provided. The system comprises at least one processor operatively connected to a memory; a classification component executed by the at least one processor, comprising classification network having a deep neural network configured to classify Euclidean measurable feature vectors and label inputs for person identification during training, and accept as an input feature vectors that are Euclidean measurable and return an unknown result or the label as output; and an enrollment interface configured to accept biometric information and trigger the classification component to integrate the biometric information into the classification network.

According to one embodiment, the enrollment interface is accessible via uri, and is configured to accept unencrypted biometric information and personally identifiable information ("PII"). According to one embodiment, the enrollment interface is configured to link the PII to a one way homomorphic encryption of an unencrypted biometric input. According to one embodiment, the enrollment interface is configured to trigger deletion of the unencrypted biometric information. According to one embodiment, the system is further configured to enroll an individual for biometric authentication; and the classification component is further configured to accept input of Euclidean measurable feature vectors for person identification during prediction. According to one embodiment, the classification component is further configured to return a set of probabilities for matching a feature vector. According to one embodiment, the classification component is further configured to predict an outcome based on a trained model, a set of inputs for the prediction and a result of a class (persons) or UNKNOWN (all returned values dictating UNKNOWN).

According to one embodiment, the system further comprises an interface configured to accept a biometric input and return and indication of known or unknown to a requesting entity. According to one embodiment, requesting entity includes any one or more of: an application, a mobile application, a local process, a remote process, a method, and a business object. According to one embodiment, the classification component further comprising multiple classification networks for processing different types of biometric information. According to one embodiment, the classification component is further configured to match an identity of a person responsive to at least two probable biometric indicators that may be used simultaneously or as part of a voting algorithm. According to one embodiment, the classification network further comprises an input layer for accepting feature vectors of a number of dimensions, the input layer having a number of classes at least equal to the number of dimensions of the feature vector input, a first and second hidden layer, and an output layer that generates an array of values.

According to one aspect a computer implemented method for privacy-enabled biometric analysis, the method is provided. The method comprises instantiating, by at least one processor, a classification component comprising a full deep neural network configured to classify feature vectors that are Euclidean measurable and a label inputs for person identification during training, and accept as an input feature vectors that are Euclidean measurable and return an unknown result or the label as output during prediction, and an enrollment interface; accepting, by the enrollment interface, biometric information associated with a new individual; triggering the classification component to train the classification network on feature vectors derived from the biometric information and a label for subsequent identification; and return the label through for subsequent identification.

According to one embodiment, an instantiating the enrollment interface included hosting a portal accessible via uri, and the method includes accepting biometric information and personally identifiable information ("PII") through the portal. According to one embodiment, the method further comprises linking the PII to a one way homomorphic encryption of unencrypted biometric input. According to one embodiment, the method further comprises triggering deletion of unencrypted biometric information on a submitting device. According to one embodiment, method further comprises enrolling individuals for biometric authentication; and mapping labels and respective feature vectors for person identification, responsive to input of Euclidean measurable feature vectors and a label for the individual. According to one embodiment, the method further comprises returning a set of probabilities for matching a set of existing labels.

According to one embodiment, the method further comprises predicting an outcome based on a trained model, a set of inputs for the prediction and a result of a class (e.g., persons) or unknown (e.g., all returned values dictating UNKNOWN). According to one embodiment, the method further comprises accepting via an authentication interface a biometric input and returning and indication of known or unknown to a requesting entity. According to one embodiment, the requesting entity includes any one or more of: an application, a mobile application, a local process, a remote process, a method, and a business object. According to one embodiment, the method further comprises processing different types of biometric information using multiple classification networks. According to one embodiment, the method further comprises generating an identity of a person responsive to at least two probable biometric indicators that may be used simultaneously or as part of a voting algorithm.

According to one embodiment, the classification network further comprises an input layer for accepting feature vectors of a number of dimensions, the input layer having a number of classes at least equal to the number of dimensions of the feature vector input, a second hidden layer of at least twice the number of input dimensions, and an output layer that generates an array of values. According to one embodiment, the fully connected neural network further comprises an input layer for accepting feature vectors of a number of dimensions, the input layer having a number of nodes at least equal to the number of dimensions of the feature vector input, a first hidden layer of at least 500 dimensions, a second hidden layer of at least twice the number of input dimensions, and an output layer that generates an array of values that based on their position and the values, determine the label or unknown.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIGS. 4A-D are a diagram of embodiments of a fully connected neural network for classification;

FIGS. 5A-D illustrate example processing steps and example outputs during identification, according to one embodiment.

DETAILED DESCRIPTION

Figure 1:
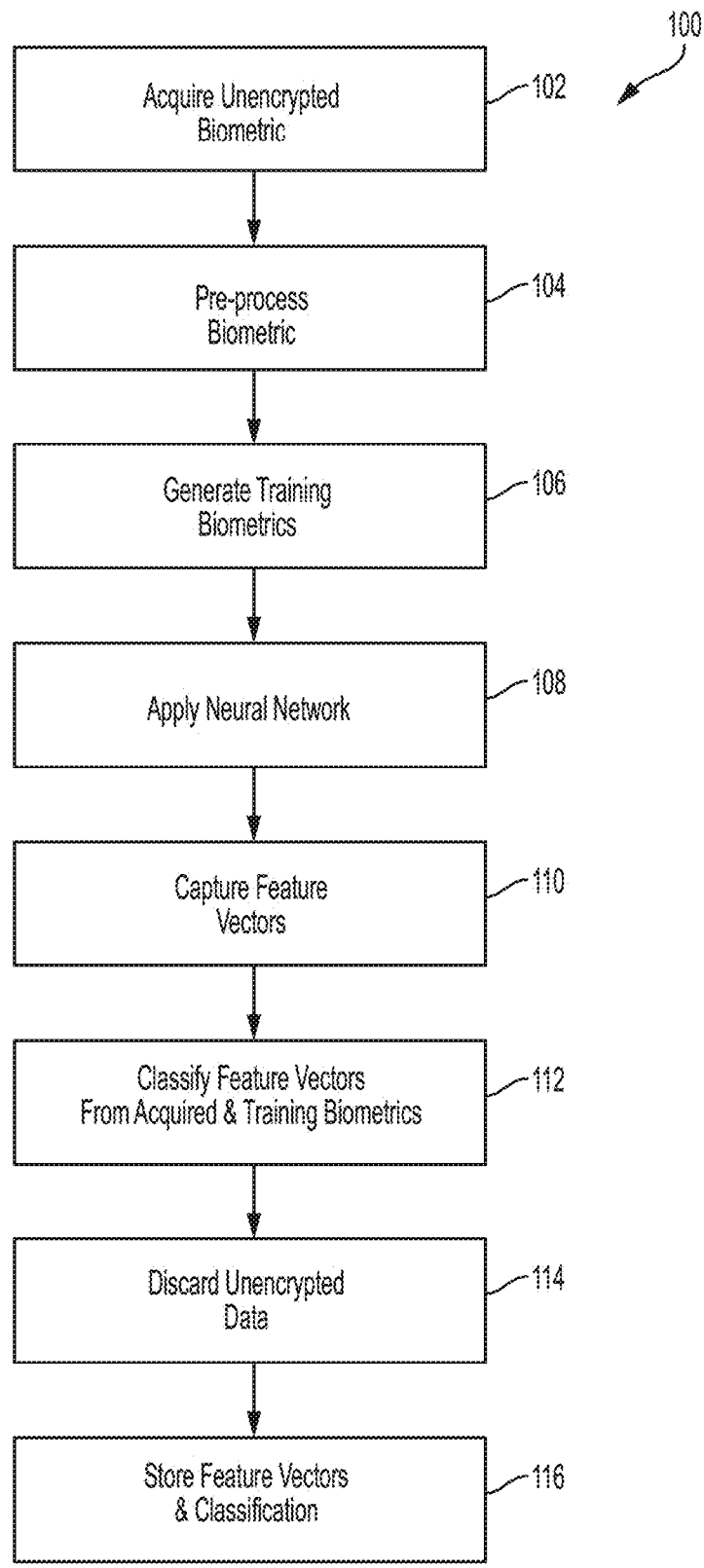
FIG. 1 is an example process flow for classifying biometric information, according to one embodiment.

According to some embodiments, the system is configured to provide one to many search and/or matching on encrypted biometrics in polynomial time. According to one embodiment, the system takes input biometrics and transforms the input biometrics into feature vectors (e.g., a list of floating point numbers (e.g., 128, 256, or within a range of at least 64 and 10240, although some embodiments can use more feature vectors)). According to various embodiments, the number of floating point numbers in each list depends on the machine learning model being employed. For example, the known FACENET model by GOOGLE generates a feature vector list of 128 floating point numbers, but other embodiments use models with different feature vectors and, for example, lists of floating point numbers.

According to various embodiments, the biometrics processing model (e.g., deep learning convolution network (e.g., for images and/or faces)) is configured such that each feature vector is Euclidean measurable when output. The input (e.g., the biometric) to the model can be encrypted using a neural network to output a homomorphic encrypted value. According to one aspect, by executing on feature vectors that are Euclidean measurable—the system produces and operates on one way homomorphic encryptions of input biometrics. These one way homomorphic encryptions can be used in encrypted operations (e.g., addition, multiplication, comparison, etc.) without knowing the underlying plaintext value. Thus, the original or input biometric can simply be discarded, and does not represent a point of failure for security thereafter. In further aspects, implementing one way encryptions eliminates the need for encryption keys that can likewise be compromised. This is a failing of many convention systems.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is an example process flow 100 for enrolling in a privacy-enabled biometric system (e.g., FIG. 3, 304 described in greater detail below). Process 100 begins with acquisition of unencrypted biometric data at 102. The unencrypted biometric data (e.g., plaintext, reference biometric, etc.) can be directly captured on a user device, received from an acquisition device, or communicated from stored biometric information. In one example, a user takes a photo of themselves on their mobile device for enrollment. Pre-processing steps can be executed on the biometric information at 104. For example, given a photo of a user, pre-processing can include cropping the image to significant portions (e.g., around the face or facial features). Various examples exist of photo processing options that can take a reference image and identify facial areas automatically.

In another example, the end user can be provided a user interface that displays a reference area, and the user is instructed to position their face from an existing image into the designated area. Alternatively, when the user takes a photo the identified area can direct the user to focus on their face so that it appears within the highlight area. In other options, the system can analyze other types of images to identify areas of interest (e.g., iris scans, hand images, fingerprint, etc.) and crop images accordingly. In yet other options, samples of voice recordings can be used to select data of the highest quality (e.g., lowest background noise), or can be processed to eliminate interference from the acquired biometric (e.g., filter out background noise).

Having a given biometric, the process 100 continues with generation of additional training biometrics at 106. For example, a number of additional images can be generated from an acquired facial image. In one example, an additional twenty five images are created to form a training set of images. In some examples, as few as three images can be used but with the tradeoff of reduce accuracy. In other examples, as many as forty training images may be created. The training set is used to provide for variation of the initial biometric information, and the specific number of additional training points can be tailored to a desired accuracy (see e.g., Tables I-VIII below provide example implementation and test results). Various ranges of training set production can be used in different embodiments (e.g., any set of images from two to one thousand). For an image set, the training group can include images of different lighting, capture angle, positioning, etc. For audio based biometrics different background noises can be introduced, different words can be used, different samples from the same vocal biometric can be used in the training set, among other options. Various embodiments of the system are configured to handle multiple different biometric inputs including even health profiles that are based at least in part on health readings from health sensors (e.g., heart rate, blood pressure, EEG signals, body mass scans, genome, etc.). According to various embodiments, biometric information includes Initial Biometric Values (IBV) a set of plaintext values (pictures, voice, SSNO, driver's license number, etc.) or any other Personally Identifiable Information ("PII") that together define a person. In some examples, the biometric value itself may be stored as PII and this plaintext may become searchable and privacy enhanced by using homomorphic encryption generating Euclidean Measurable ciphertext.

At 108, feature vectors are generated from the initial biometric information (e.g., one or more plain text values that identify an individual). Feature vectors are generated based on all available biometric information which can include a set of and training biometrics generated from the initial unencrypted biometric information received on an individual or individuals. According to one embodiment, the IBV is used in enrollment and for example in process 100. The set of IBVs are processed into a set of initial biometric vectors (e.g., feature vectors) which are used downstream in a subsequent neural network.

In one implementation, users are directed to a website to input multiple data points for biometric information (e.g., multiple pictures including facial images) in conjunction with personally identifiable information ("PII"). The system and/or execution of process 100 can include tying the PII to encryptions of the biometric as discussed below.

In one embodiment, a convolutional deep neural network is executed to process the unencrypted biometric information and transform it into feature vector which has a property of being one-way encrypted cipher text. The neural network is applied (108) to compute a one-way homomorphic encryption of the biometric—resulting in feature vectors (e.g., at 110). These outputs can be computed from an original biometric using the neural network but the values are one way in that the neural network cannot then be used to regenerate the original biometrics from the outputs.

Various embodiments take as input a neural network capable of taking plaintext input and returning Euclidean measurable output. One such implementation is FaceNet which takes in any image of a face and returns 128 floating point numbers, as the feature vector. The neural network is fairly open ended, where various implementations are configured to return a Euclidean measurable feature vector that maps to the input. This feature vector is nearly impossible to use recreate the original input biometric and is therefore considered a one-way encryption.

Various embodiments are configured to accept the feature vector(s) produced by a first neural network and use it as input to a new neural network (e.g., a second classifying neural network). According to one example, the new neural network has additional properties. This neural network is specially configured to enable incremental training (e.g., on new users and/or new feature vectors) and configured to distinguish between a known person and an unknown person. In one example, a fully connected neural network with 2 hidden layers and a "hinge" loss function is used to process input feature vectors and return a known person identifier (e.g., person label or class) or indicate that the processed biometric feature vectors are not mapped to a known person. For example, the hinge loss function outputs one or more negative values if the feature vector is unknown. In other examples, the output of the second neural network is an array of values, wherein the values and their positions in the array determined a match to a person.

Various embodiment use different machine learning models for capturing feature vectors in the first network. According to various embodiments, the feature vector capture is accomplished via a pre-trained neural network (including, for example, a convolutional neural network) where the output is Euclidean measurable. In some examples, this can include models having a softmax layer as part of the model, and capture of feature vectors can occur preceding such layers. Feature vectors can be extracted from the pre-trained neural network by capturing results from the layers that are Euclidean measurable. In some examples, the softmax layer or categorical distribution layer is the final layer of the model, and feature vectors can be extracted from the n−1 layer (e.g., the immediately preceding layer). In other examples, the feature vectors can be extracted from the model in layers preceding the last layer. Some implementations may offer the feature vector as the last layer.

The resulting feature vectors are bound to a specific user classification at 112. For example, deep learning is executed at 112 on the feature vectors based on a fully connected neural network (e.g., a second neural network). The execution is run against all the biometric data (i.e., feature vectors from the initial biometric and training biometric data) to create the classification information. According to one example, a fully connected neural network having two hidden layers is employed for classification of the biometric data. In another example, a fully connected network with no hidden layers can be used for the classification. However, the use of the fully connected network with two hidden generated better accuracy in classification (see e.g., Tables I-VIII described in greater detail below). According to one embodiment, process 100 can be executed to receive an original biometric (e.g., at 102) generate feature vectors (e.g., 110), and apply a FCNN classifier to generate a label to identify a person at 112 (e.g., output #people).

Process 100 continues with discarding any unencrypted biometric data at 114. In one example, an application on the user's phone is configured to enable enrollment of captured biometric information and configured to delete the original biometric information once processed (e.g., at 114). In other embodiments, a server system can process received biometric information and delete the original biometric information once processed. According to some aspects, only requiring that original biometric information exists for a short period during processing or enrollment significantly improves the security of the system over conventional approaches. For example, systems that persistently store or employ original biometric data become a source of vulnerability. Unlike a password that can be reset, a compromised biometric remains compromised, virtually forever.

Returning to process 100, at 116 the resulting cipher text (e.g., feature vectors) biometric is stored. In one example, the encrypted biometric can be stored locally on a user device. In other examples, the generated encrypted biometric can be stored on a server, in the cloud, a dedicated data store, or any combination thereof. In one example, the biometrics and classification is stored for use in subsequent matching or searching. For instance, new biometric information can be processed to determine if the new biometric information matches any classifications. The match (depending on a probability threshold) can then be used for authentication or validation.

In cases where a single match is executed, the neural network model employed at 112 can be optimized for one to one matching. For example, the neural network can be trained on the individual expected to use a mobile phone (assuming no other authorized individuals for the device). In some example, the neural network model can include training allocation to accommodate incremental training of the model on acquired feature vectors over time. Various embodiment, discussed in great detail below incorporate incremental training operations for the neural network to permit additional people and to incorporate newly acquired feature vectors.

In other embodiments, an optimized neural network model (e.g., FCNN) can be used for a primary user of a device, for example, stored locally, and remote authentication can use a data store and one to many models (e.g., if the first model returns unknown). Other embodiments may provide the one to many models locally as well. In some instances, the authentication scenario (e.g., primary user or not) can be used by the system to dynamically select a neural network model for matching, and thereby provide additional options for processing efficiency.

Figure 2A:
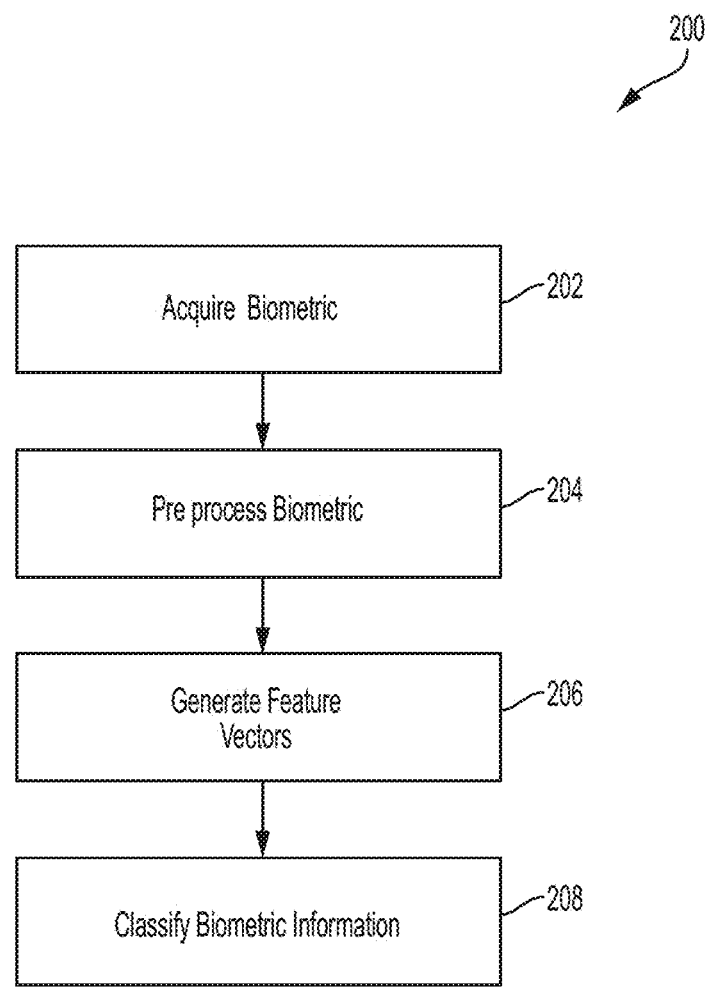
FIG. 2A is an example process flow for authentication with secured biometric data, according to one embodiment.

FIG. 2A illustrates an example process 200 for authentication with secured biometric data. Process 200 begins with acquisition of multiple unencrypted biometrics for analysis at 202. In one example, the privacy-enabled biometric system is configured to require at least three biometric identifiers (e.g., as plaintext data, reference biometric, or similar identifiers). If for example, an authentication session is initiated, the process can be executed so that it only continues to the subsequent steps if a sufficient number of biometric samples are taken, given, and/or acquired. The number of required biometric samples can vary, and take place with as few as one.

Similar to process 100, the acquired biometrics can be pre-processed at 204 (e.g., images cropped to facial features, voice sampled, iris scans cropped to relevant portions, etc.). Once pre-processing is executed the biometric information is transformed into a one-way homomorphic encryption of the biometric information to acquire the feature vectors for the biometrics under analysis (e.g., at 206). Similar to process 100, the feature vectors can be acquired using any pre-trained neural network that outputs Euclidean measurable feature vectors. In one example, this includes a pre-trained neural network that incorporates a softmax layer. However, other examples do not require the pre-trained neural network to include a softmax layer, only that they output Euclidean measurable feature vectors. In one, example, the feature vectors can be obtain in the layer preceding the softmax layer as part of step 206.

Figure 4B:
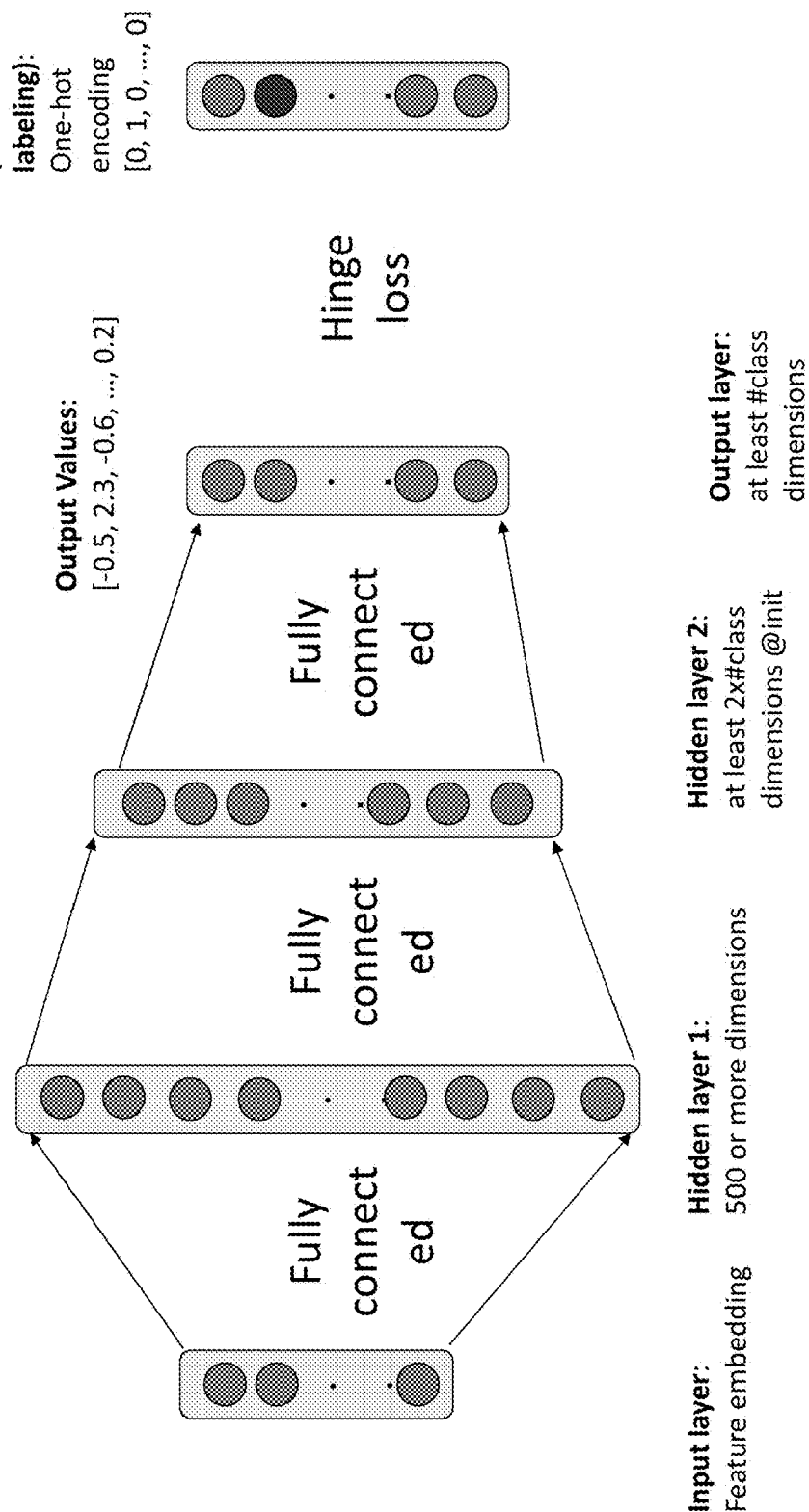
Figure 4C:
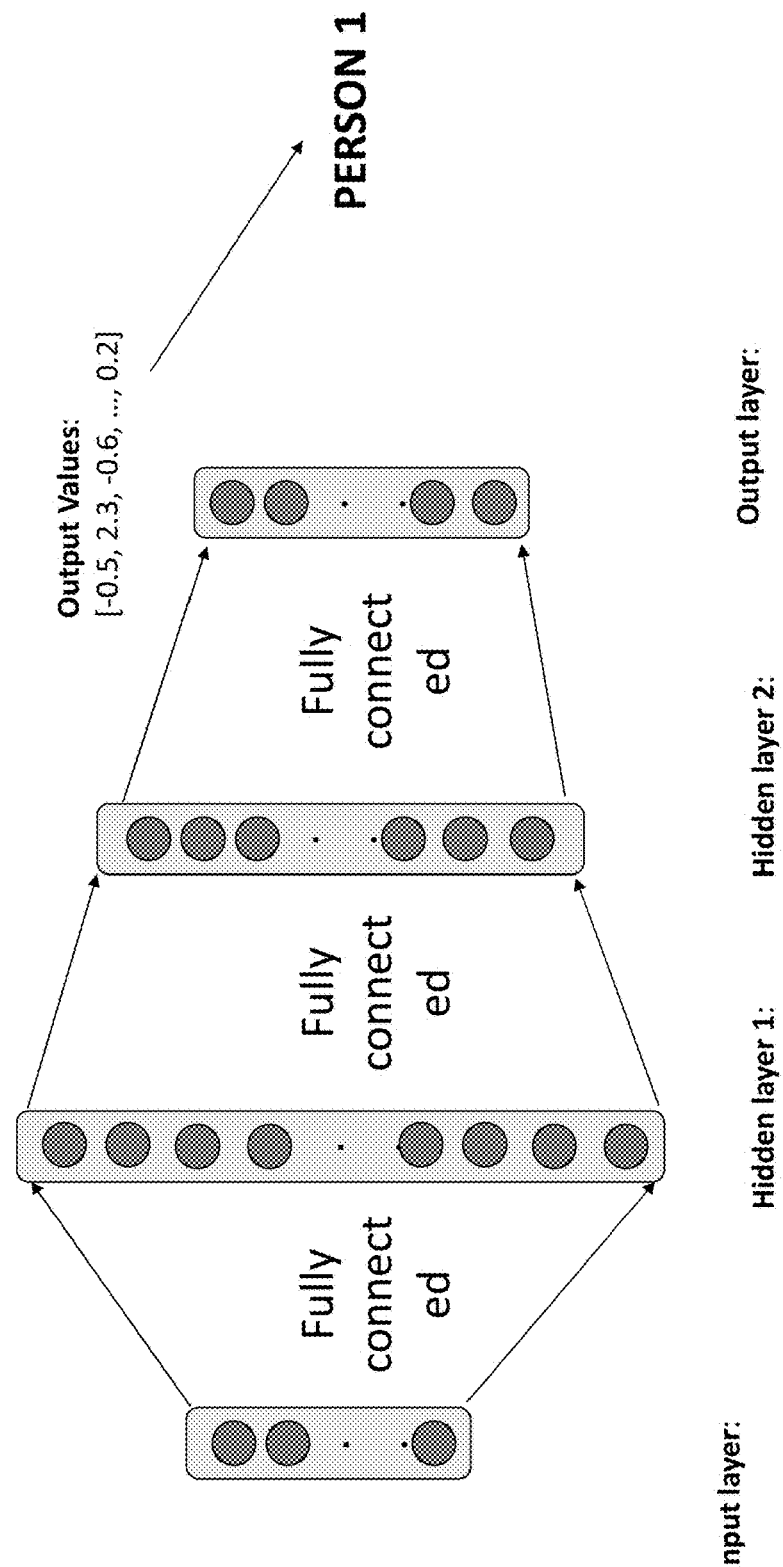
Figure 4D:
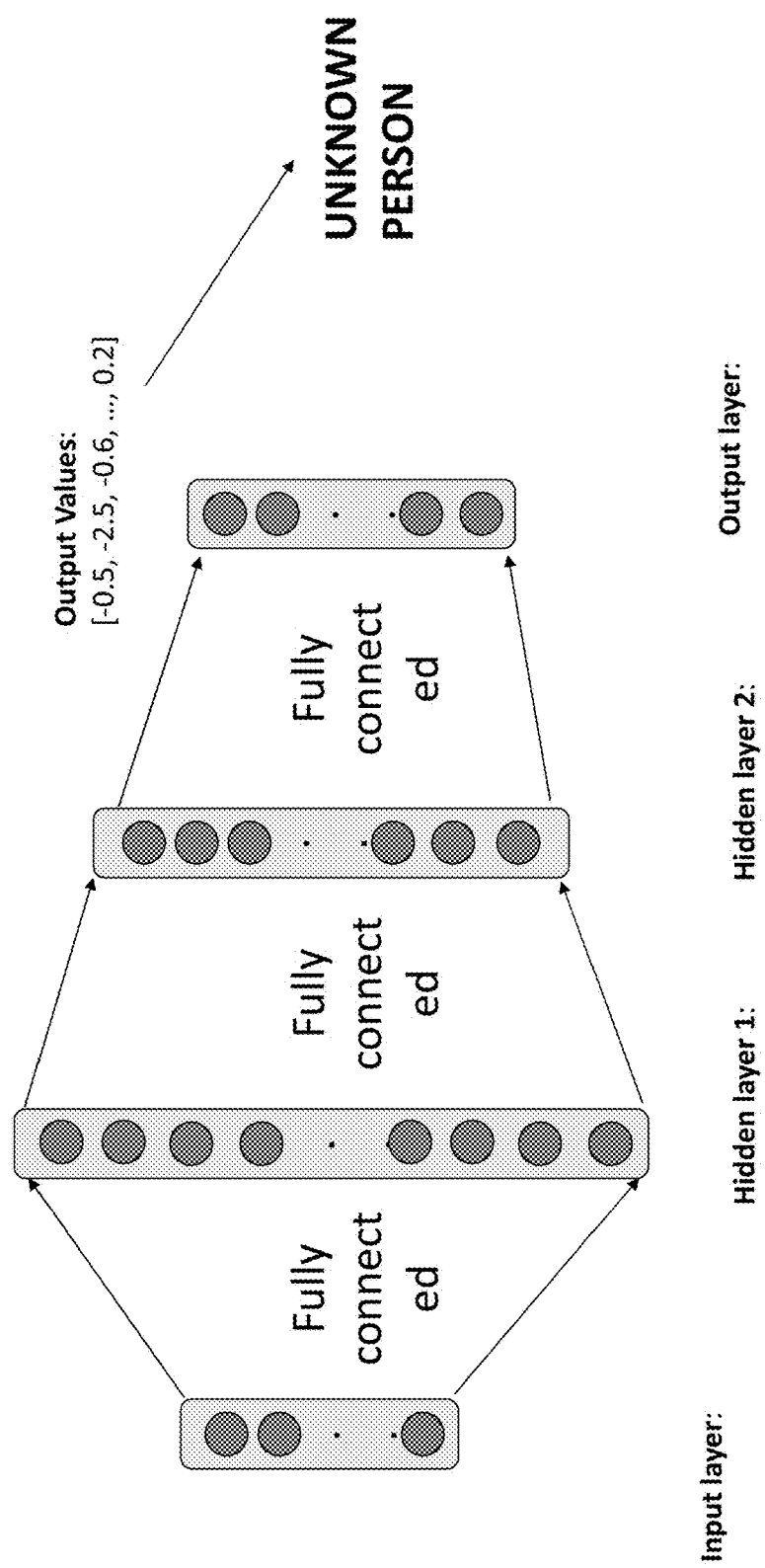
Figure 5A:
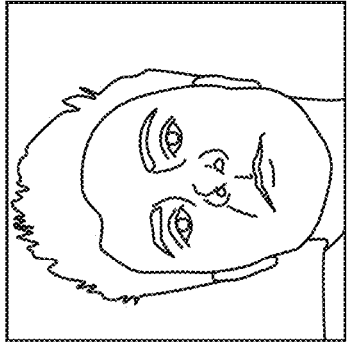
Figure 5C:
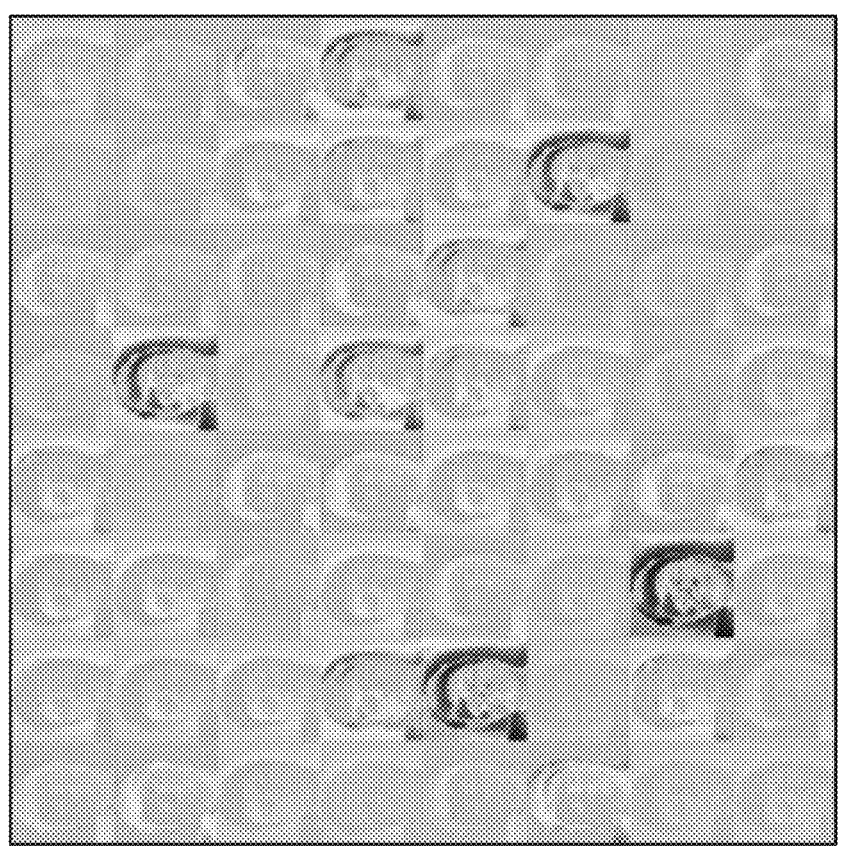
Figure 5C:
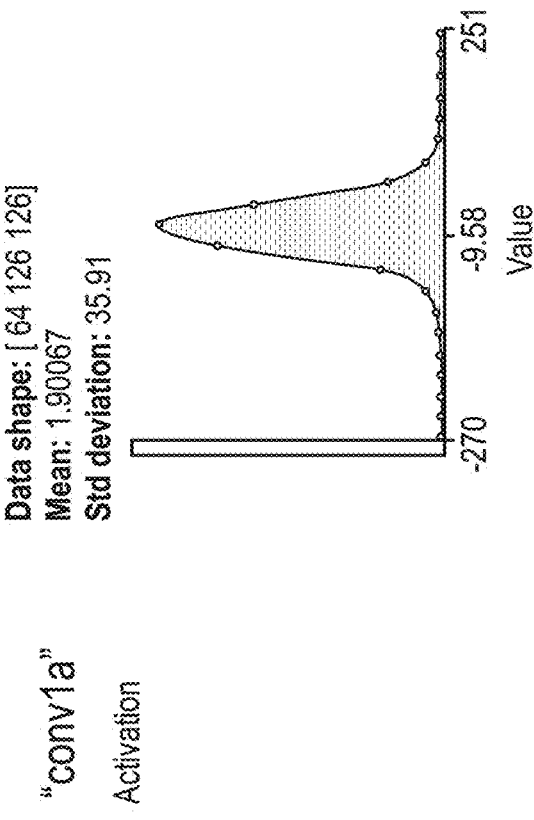
Figure 5D:
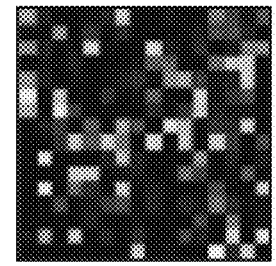
Figure 5D:
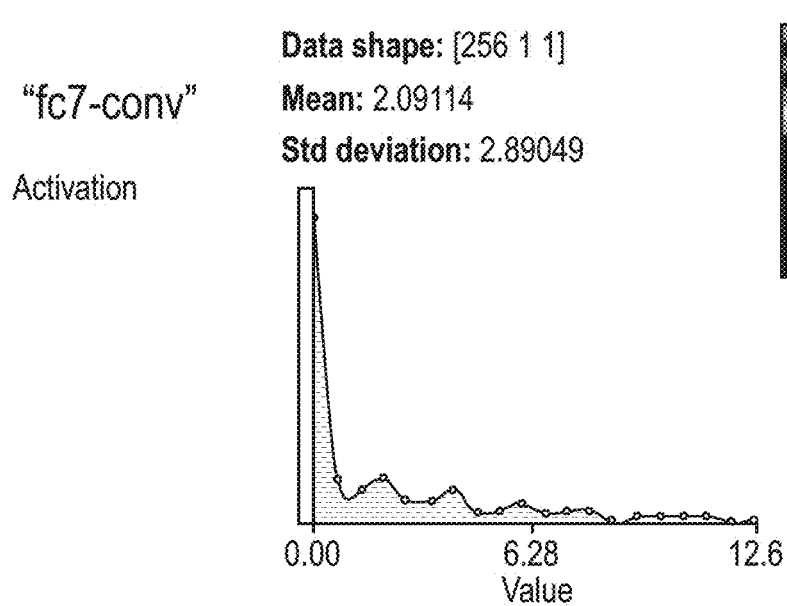
Figure 5D:
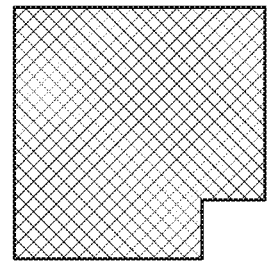
Figure 5D:
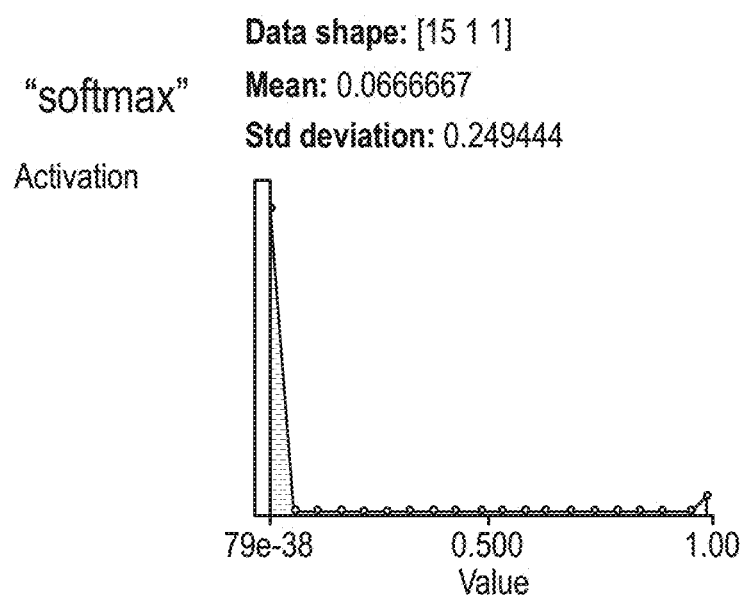

At 208, a prediction (e.g., a via deep learning neural network) is executed to determine if there is a match for the person associated with the analyzed biometrics. As discussed above with respect to process 100, the prediction can be executed as a fully connected neural network having two hidden layers (during enrollment the neural network is configured to identify input feature vectors as individuals or unknown, and unknowns individuals can be added via incremental training or full retraining of the model). In other examples, a fully connected neural network having no hidden layers can be used. Examples of neural networks are described in greater detail below (e.g., FIG. 4 illustrates an example neural network 400). Other embodiments of the neural network can be used in process 200. According to some embodiments, the neural network features include operates as a classifier during enrollment to map feature vectors to identifications; operates as a predictor to identify a known person or an unknown. In some embodiments, different neural networks can be tailored to different types of biometrics, and facial images processed by one, while voice biometrics are processed by another.

According to some embodiments, process 208 is described agnostic to submitter security. In other words, process 200 relies on front end application configuration to ensure submitted biometrics are captured from the person trying to authenticate. As process 200 is agnostic to submitter security, the process can be executed in local and remote settings in the same manner. However, according to some implementations the execution relies on the native application or additional functionality in an application to ensure an acquired biometric represents the user to be authenticated or matched.

Figure 2B:
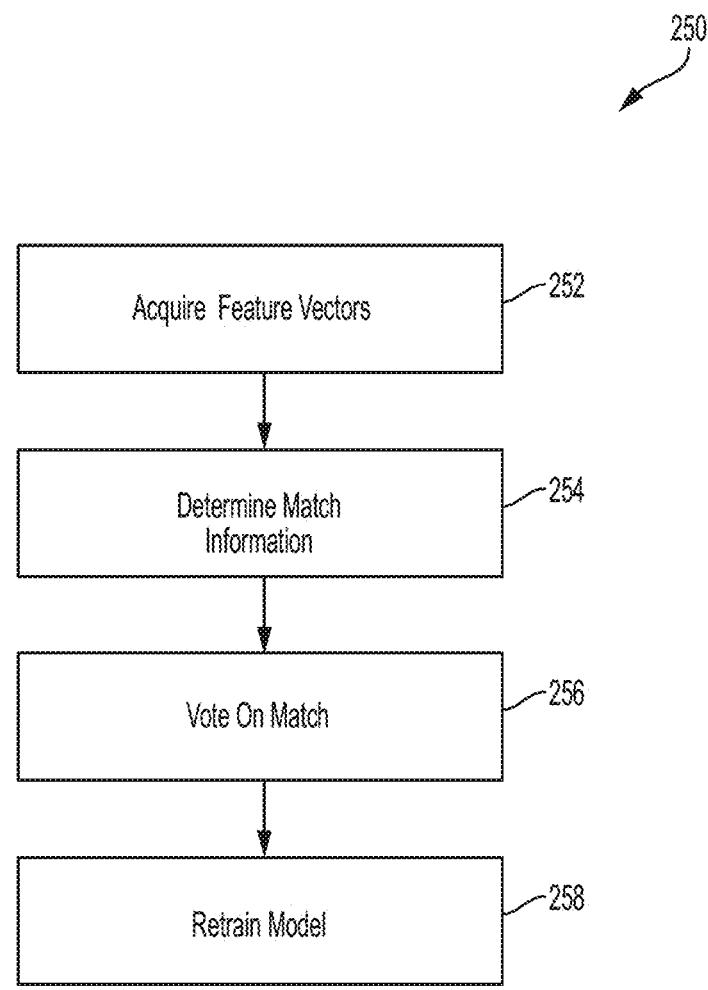
FIG. 2B is an example process flow for one to many matching execution, according to one embodiment.

FIG. 2B illustrates an example process flow 250 showing additional details for a one to many matching execution (also referred to as prediction). According to one embodiment, process 250 begins with acquisition of feature vectors (e.g., step 206 of FIG. 2A or 110 of FIG. 1). At 254, the acquired feature vectors are matched against existing classifications via a deep learning neural network. In one example, the deep learning neural network has been trained during enrollment on s set of individuals. The acquired feature vectors will be processed by the trained deep learning network to predict if the input is a match to known individual or does not match and returns unknown. In one example, the deep learning network is a fully connected neural network ("FCNN"). In other embodiments, different network models are used for the second neural network.

According to one embodiment, the FCNN outputs an array of values. These values, based on their position and the value itself, determine the label or unknown. According to one embodiment, returned from a one to many case are a series of probabilities associated with the match—assuming five people in the trained data: the output layer showing probability of match by person: [0.1, 0.9, 0.3, 0.2, 0.1] yields a match on Person 2 based on a threshold set for the classifier (e.g., >0.5). In another run, the output layer: [0.1, 0.6, 0.3, 0.8, 0.1] yields a match on Person 2 & Person 4 (e.g., using the same threshold).

However, where two results exceed the match threshold, the process and or system is configured to select the maximum value and yield a (probabilistic) match Person 4. In another example, the output layer: [0.1, 0.2, 0.3, 0.2, 0.1] shows no match to a known person—hence an UNKNOWN person—as no values exceed the threshold. Interestingly, this may result in adding the person into the list of authorized people (e.g., via enrollment discussed above), or this may result in the person being denied access or privileges on an application. According to various embodiments, process 250 is executed to determine if the person is known or not. The functions that result can be dictated by the application that requests identification of an analyzed biometrics.

For an UNKNOWN person, i.e. a person never trained to the deep learning enrollment and prediction neural network, an output layer of an UNKNOWN person looks like [−0.7, −1.7, −6.0, −4.3]. In this case, the hinge loss function has guaranteed that the vector output is all negative. This is the case of an UNKNOWN person. In various embodiments, the deep learning neural network must have the capability to determine if a person is UNKNOWN. Other solutions that appear viable, for example, support vector machine ("SVM") solutions break when considering the UNKNOWN case. According to various embodiments, the deep learning neural network (e.g., an enrollment & prediction neural network) is configured to train and predict in polynomial time.

Step 256 can be executed to vote on matching. According to one embodiment, multiple images or biometrics are processed to identify a match. In an example where three images are processed the FCNN is configured to generate an identification on each and use each match as a vote for an individual's identification. Once a majority is reached (e.g., at least two votes for person A) the system returns as output identification of person A. In other instance, for example, where there is a possibility that an unknown person may result—voting can be used to facilitate determination of the match or no match. In one example, each result that exceeds the threshold probability can count as one vote, and the final tally of votes (e.g., often 4 out of 5) is used to establish the match. In some implementations, an unknown class may be trained in the model—in the examples above a sixth number would appear with a probability of matching the unknown model. In other embodiments, the unknown class is not used, and matching is made or not against known persons. Where a sufficient match does not result, the submitted biometric information is unknown.

Responsive to matching on newly acquired biometric information, process 250 can include an optional step 258 for retraining of the classification model. In one example, a threshold is set such that step 258 tests if a threshold match has been exceed, and if yes, the deep learning neural network (e.g., classifier & prediction network) is retrained to include the new feature vectors being analyzed. According to some embodiments, retraining to include newer feature vectors permits biometrics that change over time (e.g., weight loss, weight gain, aging or other events that alter biometric information, haircuts, among other options).

Figure 3:
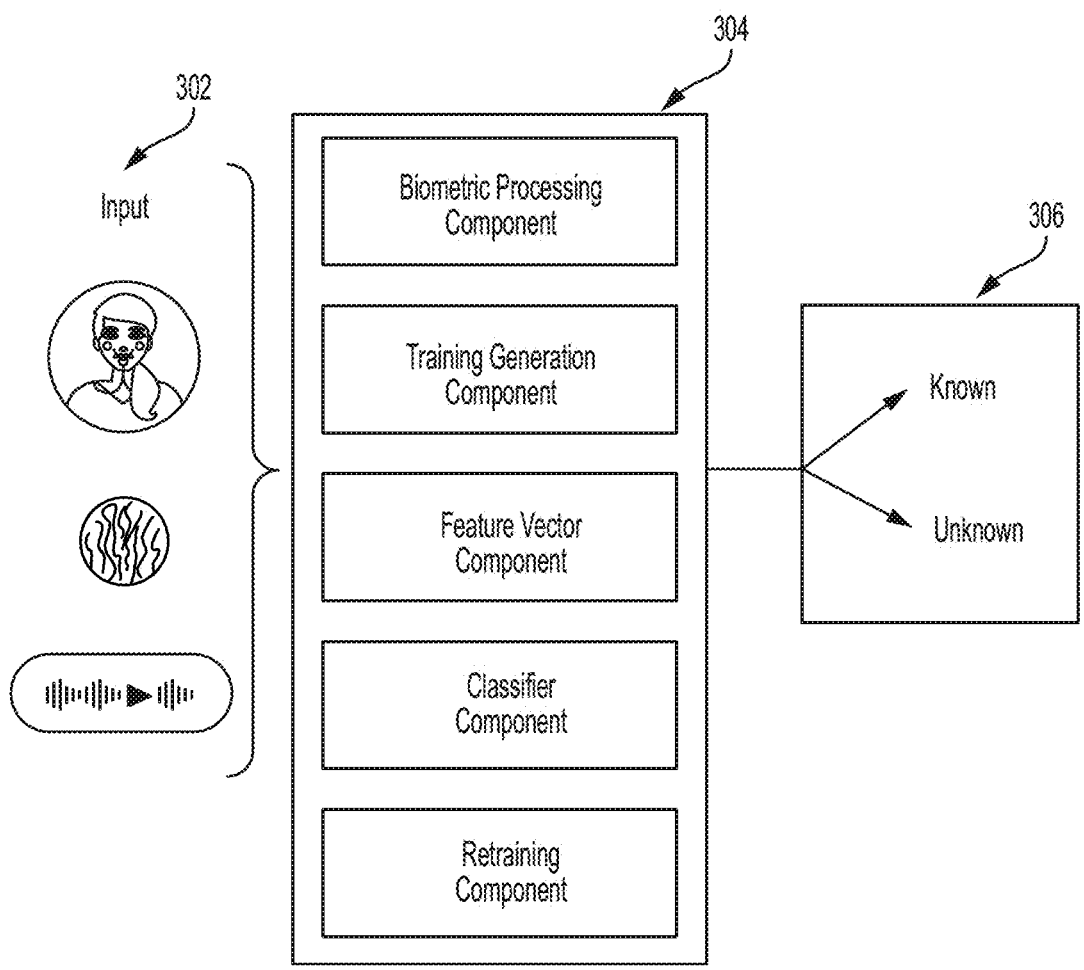
FIG. 3 is a block diagram of an embodiment of a privacy-enabled biometric system, according to one embodiment.

FIG. 3 is a block diagram of an example privacy-enabled biometric system 304. According to some embodiments, the system can be installed on a mobile device or called from a mobile device (e.g., on a remote server or cloud based resource) to return an authenticated or not signal. In various embodiments system 304 can executed any of the preceding processes. For example, system 304 can enroll users (e.g., via process 100), identify enrolled users (e.g., process 200), and search for matches to users (e.g., process 250).

According to various embodiments, system 304 can accept, create or receive original biometric information (e.g., input 302). The input 302 can include images of people, images of faces, thumbprint scans, voice recordings, sensor data, etc. A biometric processing component (e.g., 308) can be configured to crop received images, sample voice biometrics, etc., to focus the biometric information on distinguishable features (e.g., automatically crop image around face). Various forms of pre-processing can be executed on the received biometrics, designed to limit the biometric information to important features. In some embodiments, the pre-processing (e.g., via 308) is not executed or available. In other embodiments, only biometrics that meet quality standards are passed on for further processing.

Processed biometrics can be used to generate additional training data, for example, to enroll a new user. A training generation component 310 can be configured to generate new biometrics for a user. For example, the training generation component can be configured to create new images of the users face having different lighting, different capture angles, etc., in order to build a train set of biometrics. In one example, the system includes a training threshold specifying how many training samples to generate from a given or received biometric. In another example, the system and/or training generation component 310 is configured to build twenty five additional images from a picture of a user's face. Other numbers of training images, or voice samples, etc., can be used.

The system is configured to generate feature vectors from the biometrics (e.g., process images from input and generated training images). In some examples, the system 304 can include a feature vector component 312 configured to generate the feature vectors. According to one embodiment, component 312 executes a convolution neural network ("CNN"), where the CNN includes a layer which generates Euclidean measurable output. The feature vector component 312 is configured to extract the feature vectors from the layers preceding the softmax layer (including for example, the n−1 layer). As discussed above, various neural networks can be used to define features vectors tailored to an analyzed biometric (e.g., voice, image, health data, etc.), where an output of or with the model is Euclidean measurable. Some examples of these neural network include model having a softmax layer. Other embodiment, use a model that does not include a softmax layer to generate Euclidean measurable vectors. Various embodiment of the system and/or feature vector component are configured to generate and capture feature vectors for the processed biometrics in the layer or layer preceding the softmax layer.

According to another embodiment, the feature vectors from the feature vector component 312 or system 304 are used by the classifier component 314 to bind a user to a classification (i.e., mapping biometrics to an match able/searchable identity). According to one embodiment, the deep learning neural network (e.g., enrollment and prediction network) is executed as a FCNN trained on enrollment data. In one example, the FCNN generates an output identifying a person or indicating an UNKNOWN individual (e.g., at 306). Other examples, do not use fully connected neural networks.

According to various embodiments, the deep learning neural network (e.g., which can be an FCNN) must differentiate between known persons and the UNKNOWN. In some examples, this can be implement as a sigmoid function in the last layer that outputs probability of class matching based on newly input biometrics or showing failure to match. Other examples achieve matching based on a hinge loss functions.

In further embodiments, the system 304 and/or classifier component 314 are configured to generate a probability to establish when a sufficiently close match is found. In some implementations, an unknown person is determined based on negative return values. In other embodiments, multiple matches can be developed and voting can also be used to increase accuracy in matching.

Various implementations of the system have the capacity to use this approach for more than one set of input. The approach itself is biometric agnostic. Various embodiments employ feature vectors that are Euclidean measurable, which is handled using the first neural network. In some instances, different neural networks are configured to process different types of biometrics. Using that approach the vector generating neural network may be swapped for or use a different neural network in conjunction with others where each is capable of creating a Euclidean measurable feature vector based on the respective biometric. Similarly, the system may enroll in both biometric types (e.g., use two or more vector generating networks) and predict on the features vectors generated for both types of biometrics using both neural networks for processing respective biometric type simultaneously. In one embodiment, feature vectors from each type of biometric can likewise be processed in respective deep neural networks configured to predict matches based on feature vector inputs or return unknown. The simultaneous results (e.g., one from each biometric type) may be used to identify using a voting scheme or may better perform by firing both predictions simultaneously According to further embodiments, the system can be configured to incorporate new identification classes responsive to receiving new biometric information. In one embodiment, the system 304 includes a retraining component configured to monitor a number of new biometrics (e.g., per user/identification class or by total number of new biometrics) and automatically trigger a re-enrollment with the new feature vectors derived from the new biometric information (e.g., produced by 312). In other embodiments, the system can be configured to trigger re-enrollment on new feature vectors based on time or time period elapsing.

The system 304 and/or retraining component 316 can be configured to store feature vectors as they are processed, and retain those feature vectors for retraining (including for example feature vectors that are unknown to retrain an unknown class in some examples). Various embodiments of the system are configured to incrementally retrain the model on system assigned numbers of newly received biometrics. Further, once a system set number of incremental retraining have occurred the system is further configured to complete a full retrain of the model. The variables for incremental retraining and full retraining can be set on the system via an administrative function. Some defaults include incremental retrain every 3, 4, 5, 6 identifications, and full retrain every 3, 4, 5, 6, 7, 8, 9, 10 incremental retrains. Additionally, this requirement may be met by using calendar time, such as retraining once a year. These operations can performed on offline (e.g., locked) copies of the model, and once complete the offline copy can be made live.

Additionally, the system 304 and/or retraining component 316 is configured to update the existing classification model with new users/identification classes. According to various embodiments, the system builds a classification model for an initial number of users, which can be based on an expected initial enrollment. The model is generated with empty or unallocated spaces to accommodate new users. For example, a fifty user base is generated as a one hundred user model. This over allocation in the model enables incremental training to be executed on the classification model. When a new user is added, the system is and/or retraining component 316 is configured to incrementally retrain the classification model—ultimately saving significant computation time over convention retraining executions. Once the over allocation is exhausted (e.g., 100 total identification classes) a full retrain with an additional over allocation can be made (e.g., fully retrain the 100 classes to a model with 150 classes). In other embodiments, an incremental retrain process can be executed to add additional unallocated slots.

Even with the reduced time retraining, the system can be configured to operate with multiple copies of the classification model. One copy may be live that is used for authentication or identification. A second copy may be an update version, that is taken offline (e.g., locked from access) to accomplish retraining while permitting identification operations to continue with a live model. Once retraining is accomplished, the updated model can be made live and the other model locked and updated as well. Multiple instances of both live and locked models can be used to increase concurrency.

According to some embodiments, the system 300 can receive feature vectors instead of original biometrics and processing original biometrics can occur on different systems—in these cases system 300 may not include, for example, 308, 310, 312, and instead receive feature vectors from other systems, components or processes.

FIGS. 4A-D illustrate example embodiments of a classifier network. The embodiments show a fully connected neural network for classifying feature vectors for training and for prediction. Other embodiments implement different neural networks, including for example, neural networks that are not fully connected. Each of the networks accepts Euclidean measurable feature vectors and returns a label or unknown result for prediction or binds the feature vectors to a label during training.

FIGS. 5A-D illustrate examples of processing that can be performed on input biometrics (e.g., facial image) using a neural network. Feature vectors can be extracted from such neural networks and used by a classifier (e.g., FIGS. 4A-D) during training or prediction operations. According to various embodiments, the system implements a first pre-trained neural network for generating Euclidean measurable feature vectors that are used as inputs for a second classification neural network. In other embodiments, other neural networks are used to process biometrics in the first instance. In still other examples, multiple neural networks can be used to generated Euclidean measurable feature vectors from unencrypted biometric inputs each may feed the feature vectors to a respective classifier. In some examples, each generator neural network can be tailored to a respective classifier neural network, where each pair (or multiples of each) is configured to process a biometric data type (e.g., facial image, iris images, voice, health data, etc.).

Implementation Examples

The following example instantiations are provided to illustrates various aspects of privacy-enabled biometric systems and processes. The examples are provide to illustrate various implementation details and provide illustration of execution options as well as efficiency metrics. Any of the details discussed in the examples can be used in conjunction with various embodiments.

It is realized that conventional biometric solutions have security vulnerability and efficiency/scalability issues. Apple, Samsung, Google and MasterCard have each launched biometric security solutions that share at least three technical limitations. These solutions are (1) unable to search biometrics in polynomial time; (2) do not one-way encrypt the reference biometric; and (3) require significant computing resources for confidentiality and matching.

Modern biometric security solutions are unable to scale (e.g. Apple Face ID™ authenticates only one user) as they are unable to search biometrics in polynomial time. In fact, the current "exhaustive search" technique requires significant computing resources to perform a linear scan of an entire biometric datastore to successfully one-to-one record match each reference biometric and each new input record—this is as a result of inherent variations in the biometric instances of a single individual.

Similarly, conventional solutions are unable to one-way encrypt the reference biometric because exhaustive search (as described above) requires a decryption key and a decryption to plaintext in the application layer for every attempted match. This limitation results in an unacceptable risk in privacy (anyone can view a biometric) and authentication (anyone can use the stolen biometric). And, once compromised, a biometric—unlike a password—cannot be reset.

Finally, moderns solutions require the biometric to return to plaintext in order to match since the encrypted form is not Euclidean measurable. It is possible to choose to make a biometric two-way encrypted and return to plaintext—but this requires extensive key management and, since a two-way encrypted biometric is not Euclidean measurable, it also returns the solution to linear scan limitations.

Various embodiments of the privacy-enabled biometric system and/or methods provide enhancement over conventional implementation (e.g., in security, scalability, and/or management functions). Various embodiments enable scalability (e.g., via "encrypted search") and fully encrypt the reference biometric (e.g., "encrypted match"). The system is configure to provide an "identity" that is no longer tied independently to each application and a further enables a single, global "Identity Trust Store" that can service any identity request for any application.

Various operations are enabled by various embodiment, and the functions include. For example:

Encrypted Match: using the techniques described herein, a deep neural network ("DNN") is used to process a reference biometric to compute a one-way, homomorphic encryption of the biometric's feature vector before transmitting or storing any data. This allows for computations and comparisons on cipher texts without decryption, and ensures that only the Euclidean measurable, homomorphic encrypted biometric is available to execute subsequent matches in the encrypted space. The plaintext data can then be discarded and the resultant homomorphic encryption is then transmitted and stored in a datastore. This example allows for computations and comparisons on ciphertexts without decryption and ensures that only the Euclidean measurable, homomorphic encrypted biometric is available to execute subsequent matches in the encrypted space.

Encrypted Search: using the techniques described herein, encrypted search is done in polynomial time according to various embodiments. This allows for comparisons of biometrics and achieve values for comparison that indicate "closeness" of two biometrics to one another in the encrypted space (e.g. a biometric to a reference biometric) while at the same time providing for the highest level of privacy.

Various examples detail implementation of one-to-many identification using, for example, the N−1 layer of a deep neural network. The various techniques are biometric agnostic, allowing the same approach irrespective of the biometric or the biometric type. Each biometric (face, voice, IRIS, etc.) can be processed with a different, fully trained, neural network to create the biometric feature vector.

According to some aspects, an issue with current biometric schemes is they require a mechanism for: (1) acquiring the biometric, (2) plaintext biometric match, (3) encrypting the biometric, (4) performing a Euclidean measurable match, and (5) searching using the second neural network prediction call. To execute steps 1 through 5 for every biometric is time consuming, error prone and frequently nearly impossible to do before the biometric becomes deprecated. One goal with various embodiments, is to develop a scheme, techniques and technologies that allow the system to work with biometrics in a privacy protected and polynomial-time based way that is also biometric agnostic. Various embodiments employ machine learning to solve problems issues with (2)-(5).

According to various embodiments, assumed is or no control over devices such as cameras or sensors that acquire the to be analyzed biometrics (thus arriving as plain text). According to various embodiments, if that data is encrypted immediately and only process the biometric information as cipher text, the system provides the maximum practical level of privacy. According to another aspect, a one-way encryption of the biometric, meaning that given cipher text, there is no mechanism to get to the original plaintext, reduces/eliminates the complexity of key management of various conventional approaches. Many one-way encryption algorithms exist, such as MD5 and SHA-512—however, these algorithms are not homomorphic because they are not Euclidean measurable. Various embodiments discussed herein enable a general purpose solution that produces biometric cipher text that is Euclidean measurable using a neural network. Apply a classifying algorithm to the resulting feature vectors enables one-to-many identification. In various examples, this maximizes privacy and runs between $O(n)=1$ and $O(n)=\log(n)$ time.

As discussed above, some capture devices can encrypt the biometric via a one way encryption and provide feature vectors directly to the system. This enables some embodiments, to forgo biometric processing components, training generation components, and feature vector generation components, or alternatively to not use these elements for already encrypted feature vectors.

Example Execution and Accuracy

In some executions, the system is evaluated on different numbers of images per person to establish ranges of operating parameters and thresholds. For example, in the experimental execution the num-epochs establishes the number of interactions which can be varied on the system (e.g., between embodiments, between examples, and between executions, among other options). The LFW dataset is taken from the known labeled faces in the wild data set. Eleven people is a custom set of images and faces94 from the known source—faces94. For our examples, the epochs are the number of new images that are morphed from the original images. So if the epochs are 25, and we have 10 enrollment images, then we train with 250 images. The morphing of the images changed the lighting, angels and the like to increase the accuracy in training.

TABLE I (fully connected neural network model with 2 hidden layers + output sigmoid layer):
Input => [100, 50] => num_people (train for 100 people given 50 individuals to identify). Other embodiments improve over these accuracies for the UNKNOWN.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.90% | 86.40% |
| LFW | 70% | 30% | 11 people dataset | 2226 | 257 | min_images_per_person = 3 num-epochs = 25 | 93.90% | 87.20% |
| 11 people | 70% | 30% | Copy 2 people from LFW | 77 | 4 | min_images_per_person = 2 num-epochs = 25 | 100.00% | 50.00% |
| faces94 | 70% | 30% | 11 people dataset | 918 | 257 | min_images_per_person = 2 num-epochs = 25 | 99.10% | 79.40% |

TABLE II (0 hidden layers & output linear with decision f(x); Decision at .5 value)
Improves accuracy for the UNKNOWN case, but other implementations achieve higher accuracy.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.80% | 91.10%% |
| LFW | 70% | 30% | 11 people dataset | 2226 | 257 | min_images_per_person = 3 num-epochs = 25 | 96.60% | 97.70%% |
| 11 people | 70% | 30% | Copy 2 people from LFW | 77 | 4 | min_images_per_person = 2 num-epochs = 25 | 98.70% | 50.00%% |
| faces94 | 70% | 30% | 11 people dataset | 918 | 257 | min_images_per_person = 2 num-epochs = 25 Cut-off = 0.5 | 99.10% | 82.10%% |
| faces94 | 70% | 30% | 11 people dataset | 918 | 257 | min_images_per_person = 2 num-epochs = 25 Cut-off = 1.0 | 98.30% | 95.70% |

TABLE III

FCNN with 1 hidden layer (500 nodes) + output linear with decision

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 99.30% | 92.20% |

TABLE III-continued

FCNN with 1 hidden layer (500 nodes) + output linear with decision

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 2226 | 257 | min_images_per_person = 3  num-epochs = 25 | 97.50% | 97.70% |
| 11 people | 70% | 30% | Copy 2 people from LFW | 77 | 4 | min_images_per_person = 2  num-epochs = 25 | | |
| faces94 | 70% | 30% | 11 people dataset | 918 | 257 | min_images_per_person = 2  num-epochs = 25  Cut-off = 0.5 | 99.20% | 92.60% |
| faces94 | 70% | 30% | 11 people dataset | 918 | 257 | min_images_per_person = 2  num-epochs = 25  Cut-off = 1.0 | | |

TABLE IV

FCNN 2 Hidden Layers (500, 2 * num_people) + output linear, decisions f(x)

| Dataset | Training Set | Test Set | UNKNOWN PERSON SET | #images In Test Set | #images In UNKNOWN PERSON SET | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10  num-epochs = 25 | 98.30% | 97.70% |
| LFW | 70% | 30% | 11 people dataset | 2226 | 257 | min_images_per_person = 3  num-epochs = 25  Cut-off = 0 | 98.50% | 98.10% |
| 11 people | 70% | 30% | Copy 2 people from LFW | 77 | 4 | min_images_per_person = 2  num-epochs = 25 | | |
| faces94 | 70% | 30% | 11 people dataset | 918 | 257 | min_images_per_person = 2  num-epochs = 25  Cut-off = 0 | 98.60% | 83.80% |

In various embodiments, the neural network model is generated initially to accommodate incremental additions of new individuals to identify (e.g., 2*num_people is an example of a model initially trained for 100 people given an initial 50 individuals of biometric information). The multiple or training room provides can be tailored to the specific implementation. For example, where additions to the identifiable users is anticipated to be small additional incremental training options can include any number with ranges of 1% to 200%. In other embodiments, larger percentages can be implemented as well.

TABLE V

FCNN: 2 Hidden Layers (500, 2 * num_people) + output linear, decisions f(x), and voting - where the model is trained on 2 * the number of class identifiers for incremental training.

| Dataset | Training Set | Test Set | UNKNOWN PERSON SET | #images In Test Set | #images In UNKNOWN PERSON SET | Parameters | Accuracy In Test Set | Accuracy In UNKNOWN PERSON Set = 11 people | Accuracy In UNKNOWN PERSON Set = faces 94 |
|---|---|---|---|---|---|---|---|---|---|
| LFW | 70% | 30% | 11 people dataset | 1304 | 257 | min_images_per_person = 10  num_epochs = 25 | 98.20%  (vote) 100.00% | 98.80%  (vote) 100.00% | 88.40%  (vote) 90.80% |
| LFW | 70% | 30% | 11 people dataset | 2226 | 257 | min_images_per_person = 3  num_epochs = 25  Cut-off = 0 | 98.10%  (vote) 98.60% | 98.40%  (vote) 100.00% | 93.60%  (vote) 95.40% |

TABLE V-continued

FCNN: 2 Hidden Layers (500, 2 * num_people) + output linear, decisions f(x), and
voting - where the model is trained on 2 * the number of class identifiers for incremental training.

| Dataset | Training Set | Test Set | UNKNOWN PERSON SET | #images In Test Set | #images In UNKNOWN PERSON SET | Parameters | Accuracy In Test Set | Accuracy In UNKNOWN PERSON Set = 11 people | Accuracy In UNKNOWN PERSON Set = faces 94 |
|---|---|---|---|---|---|---|---|---|---|
| 11 people | 70% | 30% | Copy 2 people from LFW | 77 | 4 | min_images_per_person = 2 num_epochs = 25 | | | |
| faces94 | 70% | 30% | 11 people dataset | 918 | 257 | min_images_per_person = 2 Cut-off = 0 | | | |

According to one embodiment the system can be implemented as a REST compliant API that can be integrates and/or called by various programs, applications, systems, system components, etc., and can be requested locally or remotely.

In one example, the privacy-enabled biometric API includes the following specifications:

```
• Preparing data: this function takes the images & labels and save them
  into the local directory.
{
def add_training_data(list_of_images, list_of_label) :
        @params list_of_images: the list of images
        @params list_of_label: the list of corresponding labels
}
• Training model: each label (person/individual) should have at least
  2 images. In some examples, if the person does not have the
  minimum that person will be ignored.
{
def train( ) :
}
• Prediction:
{
def predict(list_of_images) :
        @params list_of_images: the list of images of the same person
        @return label: a person name or "UNKNOWN_PERSON"
}
```

Further embodiments can be configured to handle new people (e.g., labels or classes I the model) in multiple way. In one example, the current model can be retrain every time (e.g., with a threshold number) a certain number of new people are introduced. In this example, the benefit is improved accuracy—the system can guarantee a level of accuracy even with new people. There exists a trade-off in that full retraining is a slow time consuming and heavy computation process. This can be mitigated with live and offline copies of the model so the retraining occurs offline and the newly retrain model is swapped for the live version. In one example, training time executed in over 20 minutes. With more data the training time increases.

According to another example, the model is initialized with slots for new people. The expanded model is configured to support incremental training (e.g., the network structure is not changed when adding new people). In this example, the time add new people is significantly reduces (even over other embodiments of the privacy-enabled biometric system). It is realized that there may be some reduction in accuracy with incremental training, and as more and more people are added the model can trends towards overfit on the new people i.e., become less accurate with old people. However, various implementation have been tested to operate at the same accuracy even under incremental retraining.

Yet another embodiments implements both incremental retraining and full retraining at a threshold level (e.g., build the initial model with a multiple of the people as needed— (e.g., 2 times—100 labels for an initial 50 people, 50 labels for an initial 25 people, etc.)). Once the number of people reaches the upper bound (or approaches the upper bound) the system can be configured to execute a full retrain on the model, while building in the additional slots for new users. In one example, given 100 labels in the model with 50 initial people (50 unallocated) reaches 50 new people, the system will execute a full retrain for 150 labels and now 100 actual people. This provides for 50 additional users and incremental retraining before a full retrain is executed.

Stated generally, the system in various embodiments is configured to retrain the whole network from beginning for every N people step. Training data: have 100 people; step 1: train the network with N=1000 people; assign 100 people and reserving 900 to train incremental; train incrementally with new people until we reach 1000 people; and reach 1000 people, full retrain. Full retrain: train the network with 2N=2000 people; now have 1000 people for reserving to train incremental; train incrementally with new people until we reach 2000 people; and repeat the full retrain with open allocations when reach the limit.

An example implementation of the API includes the following code:

```
drop database if exists trueid;
create database trueid;
grant all on trueid.* to trueid@'localhost' identified by 'trueid';
drop table if exists feature;
drop table if exists image;
drop table if exists PII;
drop table if exists subject;
CREATE TABLE subject
(
  id INT PRIMARY KEY AUTO_INCREMENT,
  when_created TIMESTAMP DEFAULT CURRENT_TIMESTAMP
);
CREATE TABLE PII
(
  id INT PRIMARY KEY AUTO_INCREMENT,
  subject_id INT,
  tag VARCHAR(254),
  value VARCHAR(254)
);
CREATE TABLE image
(
  id INT PRIMARY KEY AUTO_INCREMENT,
  subject_id INT,
  image_name VARCHAR(254),
  is_train boolean,
  when_created TIMESTAMP DEFAULT CURRENT_TIMESTAMP
);
```

-continued

```
CREATE TABLE feature
(
    id INT PRIMARY KEY AUTO_INCREMENT,
    image_id INT NOT NULL,
    feature_order INT NOT NULL,
    feature_value DECIMAL(32,24) NOT NULL
);
```

ALTER TABLE image ADD CONSTRAINT fk_subject_id FOREIGN KEY (subject_id) REFERENCES subject (id);
ALTER TABLE PII ADD CONSTRAINT fk_subject_id_pii FOREIGN KEY (subject_id) REFERENCES subject (id);
ALTER TABLE feature ADD CONSTRAINT fk_image_id FOREIGN KEY (image_id) REFERENCES image (id);
CREATE INDEX piisubjectid ON PII(subject_id);
CREATE INDEX imagesubjectid ON image(subject_id);
CREATE INDEX imagesubjectidimage ON image(subject_id, image_name);
CREATE INDEX featureimage_id ON feature(image_id);
API Execution Example:
  Push the known LFW feature embeddings to biometric feature database.
  Simulate the incremental training process:

```
num_seed = 50      # build the model network, and first num_seed
                     people was trained fully
num_window = 50    # For every num_window people: build the model
                     network, and people trained fully
num_step = 1       # train incremental every new num_step people
num_eval =10       # evaluate the model every num_eval people
```

Build the model network with #class=100. Train from beginning (#epochs=100) with the first 50 people. The remaining 50 classes are reserved for incremental training.
  i) Incremental training for the 51st person. Train the previous model with all 51 people (#epochs=20)
  ii) Incremental training for the 52st person. Train the previous model with all 52 people (#epochs=20)
  iii) continue . . . .
(Self or automatic monitoring can be executed by various embodiments to ensure accuracy over time—alert flags can be produced if deviation or excessive inaccuracy is detected; alternatively or in conjunction full retraining can be executed responsive to excess inaccuracy and the fully retrained model evaluated to determine is accuracy issues are resolved—if so the full retrain threshold can be automatically adjusted). Evaluate the accuracy of the previous model (e.g., at every 10 steps), optionally record the training time for every step.
Achieve incremental training for maximum allocation (e.g., the 100th person). Full train of the previous model with all 100 people (e.g., #epochs=20)
Build the model network with #class=150. Train from beginning (e.g., #epochs=100) with the first 100 people. The remaining 50 classes are reserved for incremental training.
  i) Incremental training for the 101st person. Train the previous model with all 101 people (#epochs=20)
  ii) continue . . . .
Build the model network with #class=200. Train from beginning (e.g., #epochs=100) with the first 150 people. The remaining 50 classes are reserved for incremental training.
  i) Incremental training for the 151st person. Train the previous model with all 151 people (#epochs=20)
  ii) Continue . . . .
Refactor Problem:

According to various embodiments, it is realized that incremental training can trigger concurrency problems: e.g., a multi-thread problem with the same model, thus the system can be configured to avoid retrain incrementally at the same time for two different people (data can be lost if retraining occurs concurrently). In one example, the system implements a lock or a semaphore to resolve. In another example, multiple models can be running simultaneously—and reconciliation can be executed between the models in stages. In further examples, the system can monitoring models to ensure only one retrain is executed one multiple live models, and in yet others use locks on the models to ensure singular updates via incremental retrain. Reconciliation can be executed after an update between models. In further examples, the system can cache feature vectors for subsequent access in the reconciliation.

According to some embodiments, the system design resolves a data pipeline problem: in some examples, the data pipeline supports running one time due to queue and thread characteristics. Other embodiments, avoid this issue by extracting the embeddings. In examples, that do not include that functionality the system can still run multiple times without based on saving the embedding to file, and loading the embedding from file. This approach can be used where the extracted embedding is unavailable via other approaches. Various embodiments can employ different options for operating with embeddings: when we give a value to a tensorflow, we have several ways: Feed_dict (speed trade-off for easier access); and Queue: faster via multi-threads, but can only run one time (the queue will be end after it's looped).

Table VIII & TABLE IX (below) shows execution timing during operation and accuracy percentages for the example.

TABLE VI

|   | A | B | C | D | E |
|---|---|---|---|---|---|
| 1 | step | action | info | time | accuracy |
| 2 | 50 | Retrieving feature embedding | | 100.939024 | |
| 3 | 50 | Training Deep Learning classifier | | 54.34578061 | |
| 4 | 51 | Retrieving feature embedding | | 104.8042319 | |
| 5 | 51 | Training incrementally Deep Learning classifier | | 9.755134106 | |
| 6 | 52 | Retrieving feature embedding | | 105.692045 | |
| 7 | 52 | Training incrementally Deep Learning classifier | | 9.367767096 | |
| 8 | 53 | Retrieving feature embedding | | 95.68940234 | |
| 9 | 53 | Training incrementally Deep Learning classifier | | 9.33846755 | |
| 10 | 54 | Retrieving feature embedding | | 108.8445647 | |

TABLE VI-continued

| | A step | B action | C info | D time | E accuracy |
|---|---|---|---|---|---|
| 11 | 54 | Training incrementally Deep Learning classifier | | 9.668224573 | |
| 12 | 55 | Retrieving feature embedding | | 108.7391896 | |
| 13 | 55 | Training incrementally Deep Learning classifier | | 10.2577827 | |
| 14 | 56 | Retrieving feature embedding | | 107.1305535 | |
| 15 | 56 | Training incrementally Deep Learning classifier | | 9.660038471 | |
| 16 | 57 | Retrieving feature embedding | | 111.1128619 | |
| 17 | 57 | Training incrementally Deep Learning classifier | | 9.824867487 | |
| 18 | 58 | Retrieving feature embedding | | 109.780278 | |
| 19 | 58 | Training incrementally Deep Learning classifier | | 10.25701618 | |
| 20 | 59 | Retrieving feature embedding | | 114.9919829 | |
| 21 | 59 | Training incrementally Deep Learning classifier | | 9.752382278 | |
| 22 | 60 | Retrieving feature embedding | | 114.3731036 | |
| 23 | 60 | Training incrementally Deep Learning classifier | | 10.15184236 | |
| 24 | 60 | Accuracy | #test_images = 533 | | 0.988743 |
| 25 | 60 | Vote Accuracy | #test_images = 533 | | 1 |
| 26 | 61 | Retrieving feature embedding | | 118.237993 | |
| 27 | 61 | Training incrementally Deep Learning classifier | | 10.0895071 | |
| 28 | 62 | Retrieving feature embedding | | 120.2519257 | |
| 29 | 62 | Training incrementally Deep Learning classifier | | 10.69825125 | |
| 30 | 63 | Retrieving feature embedding | | 119.3803787 | |
| 31 | 63 | Training incrementally Deep Learning classifier | | 10.66580486 | |
| 32 | 64 | Retrieving feature embedding | | 138.031605 | |
| 33 | 64 | Training incrementally Deep Learning classifier | | 12.32183456 | |
| 34 | 65 | Retrieving feature embedding | | 133.2701755 | |
| 35 | 65 | Training incrementally Deep Learning classifier | | 12.35964537 | |
| 36 | 66 | Retrieving feature embedding | | 136.8798289 | |
| 37 | 66 | Training incrementally Deep Learning classifier | | 12.07544327 | |
| 38 | 67 | Retrieving feature embedding | | 140.3868775 | |
| 39 | 67 | Training incrementally Deep Learning classifier | | 12.54206896 | |
| 40 | 68 | Retrieving feature embedding | | 140.855052 | |
| 41 | 68 | Training incrementally Deep Learning classifier | | 12.59552693 | |
| 42 | 69 | Retrieving feature embedding | | 140.2500689 | |
| 43 | 69 | Training incrementally Deep Learning classifier | | 12.55604577 | |
| 44 | 70 | Retrieving feature embedding | | 144.5612676 | |
| 45 | 70 | Training incrementally Deep Learning classifier | | 12.95398426 | |
| 46 | 70 | Accuracy | #test_images = 673 | | 0.9925706 |
| 47 | 70 | Vote Accuracy | #test_images = 673 | | 1 |
| 48 | 71 | Retrieving feature embedding | | 145.2458987 | |
| 49 | 71 | Training incrementally Deep Learning classifier | | 13.09419131 | |

TABLE VII

| | A step | B action | C Info | D time | E accuracy |
|---|---|---|---|---|---|
| 67 | 80 | Training incrementally Deep Learning classifier | | 14.24880123 | |
| 68 | 80 | Accuracy | #test_images = 724 | | 0.9903315 |
| 69 | 80 | Vote Accuracy | #test_images = 724 | | 1 |
| 70 | 81 | Retrieving feature embedding | | 153.8295755 | |
| 71 | 81 | Training incrementally Deep Learning classifier | | 14.72389603 | |
| 72 | 82 | Retrieving feature embedding | | 157.9210677 | |
| 73 | 82 | Training incrementally Deep Learning classifier | | 14.57672453 | |
| 74 | 83 | Retrieving feature embedding | | 164.8383744 | |
| 75 | 83 | Training incrementally Deep Learning classifier | | 21.83570766 | |
| 76 | 84 | Retrieving feature embedding | | 161.2950387 | |
| 77 | 84 | Training incrementally Deep Learning classifier | | 14.25801277 | |
| 78 | 85 | Retrieving feature embedding | | 155.9785285 | |
| 79 | 85 | Training incrementally Deep Learning classifier | | 14.45170879 | |
| 80 | 86 | Retrieving feature embedding | | 160.9079704 | |
| 81 | 86 | Training incrementally Deep Learning classifier | | 14.81818509 | |
| 82 | 87 | Retrieving feature embedding | | 164.5734673 | |
| 83 | 87 | Training incrementally Deep Learning classifier | | 18.26664591 | |
| 84 | 88 | Retrieving feature embedding | | 169.8400548 | |
| 85 | 88 | Training incrementally Deep Learning classifier | | 15.75074983 | |
| 86 | 89 | Retrieving feature embedding | | 169.2413263 | |
| 87 | 89 | Training incrementally Deep Learning classifier | | 15.93148685 | |
| 88 | 90 | Retrieving feature embedding | | 172.5191889 | |
| 89 | 90 | Training incrementally Deep Learning classifier | | 15.88449383 | |
| 90 | 90 | Accuracy | #test_images = 822 | | 0.986618 |
| 91 | 90 | Vote Accuracy | #test_images = 822 | | 0.9963504 |
| 92 | 91 | Retrieving feature embedding | | 170.162873 | |
| 93 | 91 | Training incrementally Deep Learning classifier | | 15.72525668 | |
| 94 | 92 | Retrieving feature embedding | | 174.9947026 | |

TABLE VII-continued

| 1 | A step | B action | C Info | D time | E accuracy |
|---|---|---|---|---|---|
| 95 | 92 | Training incrementally Deep Learning classifier | | 15.791049 | |
| 96 | 93 | Retrieving feature embedding | | 175.3449857 | |
| 97 | 93 | Training incrementally Deep Learning classifier | | 15.8756597 | |
| 98 | 94 | Retrieving feature embedding | | 177.0825081 | |
| 99 | 94 | Training incrementally Deep Learning classifier | | 15.72812366 | |
| 100 | 95 | Retrieving feature embedding | | 178.8846812 | |
| 101 | 95 | Training incrementally Deep Learning classifier | | 16.04615927 | |
| 102 | 96 | Retrieving feature embedding | | 171.2114341 | |
| 103 | 96 | Training incrementally Deep Learning classifier | | 16.32442522 | |
| 104 | 97 | Retrieving feature embedding | | 177.8708515 | |
| 105 | 97 | Training incrementally Deep Learning classifier | | 15.90093112 | |
| 106 | 98 | Retrieving feature embedding | | 177.5916936 | |
| 107 | 98 | Training incrementally Deep Learning classifier | | 16.57834721 | |
| 108 | 99 | Retrieving feature embedding | | 185.1854212 | |
| 109 | 99 | framing incrementally Deep Learning classifier | | 16.64935994 | |
| 110 | 100 | Retrieving feature embedding | | 179.5375969 | |
| 111 | 100 | Training incrementally Deep Learning classifier | | 17.24395561 | |
| 112 | 100 | Accuracy | #test_images = 875 | | 0.9897143 |
| 113 | 100 | Vote Accuracy | #test_images = 875 | | 1 |
| 114 | 100 | Retrieving feature embedding | | 184.8017459 | |

TABLE VIII

Table VIII shows summary information for additional executions.

| Dataset | Training Set | Test Set | UNKNOWN PERSON Set | #people in Traing Set | #images In Test Set | #images In UNKNOWN PERSON Set | Parameters | Accuracy In Test Set |
|---|---|---|---|---|---|---|---|---|
| LFW | 70% | 30% | 11 people dataset | 158 | 1304 | 257 | min_images_per_person = 10<br>num-epochs = 25<br>Cut-off = 0 | 98.70%<br>(vote)<br>100.00% |
| LFW | 70% | 30% | 11 people dataset | 901 | 2226 | 257 | min_images_per_person = 3<br>num-epochs = 25<br>Cut-off = 0 | 93.80%<br>(vote)<br>95.42% |

According to one embodiment, the system can be described broadly to include the any one or more or any combination of the following elements and associated functions:

Preprocessing: where the system takes in an unprocessed biometric, which can include cropping and aligning and either continues processing or returns that the biometric cannot be processed.

Neural network 1: Pre-trained. Takes in unencrypted biometrics. Returns biometric feature vectors that are one way encrypted and Euclidean measurable. That is it's only purpose.

Neural network 2: Not pre-trained. It is a deep learning neural network that does classification. Includes incremental training, takes a set of label, feature vector pairs as input and returns nothing during training—the trained network is used for matching or prediction on newly input biometric information. Does prediction, which takes a feature vector as input and returns an array of values. These values, based on their position and the value itself, determine the label or unknown.

Voting functions can be executed with neural network 2 e.g., during prediction.

System may have more than one neural network 1 for different biometrics. Each would generate feature vectors based on unencrypted input.

System may have multiple neural network 2(s) one for each biometric type.

Figure 6:
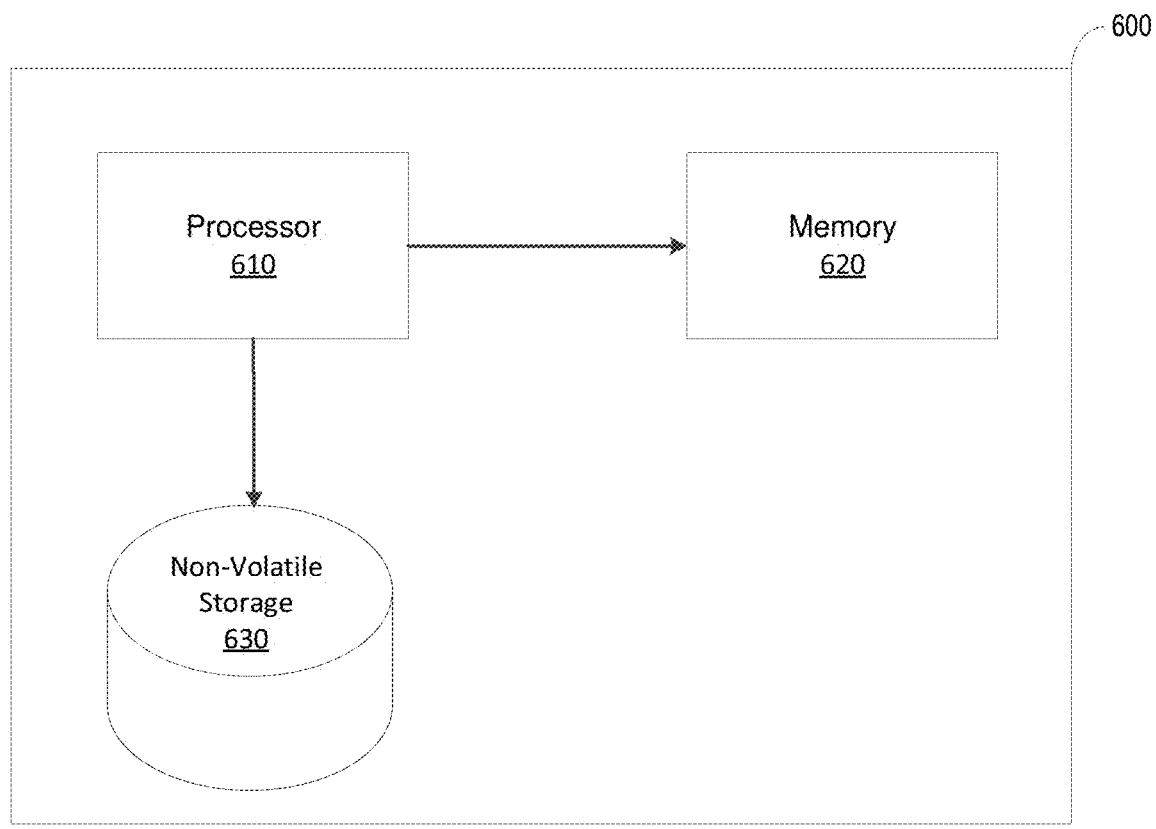
FIG. 6 is a block diagram of an embodiment of a special purpose computer system program to execute the processes and/or functions described herein.

Modifications and variations of the discussed embodiments will be apparent to those of ordinary skill in the art and all such modifications and variations are included within the scope of the appended claims. An illustrative implementation of a computer system 600 that may be used in connection with any of the embodiments of the disclosure provided herein is shown in FIG. 6. The computer system 600 may include one or more processors 610 and one or more articles of manufacture that comprise non-transitory computer-readable storage media (e.g., memory 620 and one or more non-volatile storage media 630). The processor 610 may control writing data to and reading data from the memory 620 and the non-volatile storage device 630 in any suitable manner. To perform any of the functionality described herein, the processor 610 may execute one or more processor-executable instructions stored in one or more non-transitory computer-readable storage media (e.g., the memory 620), which may serve as non-transitory computer-readable storage media storing processor-executable instructions for execution by the processor 610. The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIGS. 1 and 2A-2B) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. A privacy-enabled biometric system comprising:
   at least one processor operatively connected to a memory;
   a classification component executed by the at least one processor, comprising a classification network having a deep neural network configured to:
   classify Euclidean measurable encrypted feature vectors and label inputs for identification during training, and
   accept as an input, to the deep neural network, encrypted feature vectors that are Euclidean measurable and are produced as a one way encoding of unencrypted biometric information by a first pre-trained neural network, and return an unknown result or a matching label as output; and
   an enrollment interface configured to:
   accept unencrypted biometric information;
   provide Euclidean measurable encrypted feature vectors generated from the first pre-trained neural network based on the unencrypted biometric information;
   delete the unencrypted biometric information responsive to generation of the Euclidean measurable encrypted feature vectors by the first pre-trained neural network;
   provide a respective label to the classification component for training; and
   trigger the classification component to train the deep neural network on the Euclidean measurable encrypted feature vectors to link the label to respective encrypted feature vectors;

wherein the first pre-trained neural network is configured to:
- accept unencrypted biometric information; and
- encode the unencrypted biometric information into Euclidean measurable encrypted feature vectors as one way encodings of the unencrypted biometric information.

2. The system of claim 1, wherein the enrollment interface is accessible via uri, and is configured to accept unencrypted biometric information and personally identifiable information ("PII").

3. The system of claim 2, wherein the enrollment interface is configured to link the PII to a one way homomorphic encryption of an unencrypted biometric input.

4. The system of claim 1, wherein the classification component is further configured to return a set of probabilities for matching an input Euclidean measurable encrypted feature vector.

5. The system of claim 1, wherein the classification component is further configured to predict an outcome based on a trained model, a set of inputs for the prediction and a result of a match or unknown.

6. The system of claim 1, further comprising an interface configured to accept a biometric input and return an indication of known or unknown to a requesting entity.

7. The system of claim 6, wherein the requesting entity includes any one or more of: an application, a mobile application, a local process, a remote process, a method, and a business object.

8. The system of claim 1, wherein the classification component further comprises multiple classification networks for processing different types of biometric information.

9. The system of claim 1, wherein the classification component is further configured to match an identity of a person responsive to at least two probable biometric indicators, wherein the at least two probable biometric indicators are evaluated as part of a voting algorithm.

10. The system of claim 1, wherein the system is further configured to enroll an entity for biometric authentication; and the classification component is further configured to accept input of Euclidean measurable encrypted feature vectors for person identification during prediction.

11. A computer implemented method for privacy-enabled biometric analysis, the method comprising:
instantiating, by at least one processor, a classification component comprising a deep neural network configured to:
- classify encrypted feature vectors that are Euclidean measurable and label inputs for identification during training, and
- accept as an input encrypted feature vectors that are Euclidean measurable and are produced as a one way encoding of unencrypted biometric information by a first pre-trained neural network, and return an unknown result or a label as output during prediction:

instantiating, by the at least one processor, an enrollment interface;

accepting, by the enrollment interface, unencrypted biometric information associated with a new entity;

encoding, by the first pre-trained neural network, the unencrypted biometric information into Euclidean measurable encrypted feature vectors that are one way encodings of the unencrypted biometric information;

deleting, by the at least one processor, the unencrypted biometric information responsive to generation of the Euclidean measurable encrypted feature vectors by the first pre-trained neural network;

triggering, by the at least one processor, the classification component to train the deep neural network on the Euclidean measurable encrypted feature vectors derived from the biometric information to link a respective label to respective encrypted feature vectors; and returning, by the classification component, an unknown result or a matching label for subsequent identification.

12. The method of claim 11, wherein instantiating the enrollment interface includes hosting a portal accessible via uri, and the method includes accepting biometric information and personally identifiable information ("PII") through the portal.

13. The method of claim 11, wherein the method further comprises linking personally identifiable information ("PII") to a one way homomorphic encryption of an unencrypted biometric input.

14. The method of claim 11, wherein the method further comprises:
- enrolling individuals for biometric authentication; and
- mapping labels and respective feature vectors for person identification, responsive to input of encrypted Euclidean measurable feature vectors and a label for the individual.

15. The method of claim 11, wherein the method further comprises returning a set of probabilities for matching a set of existing labels.

16. The method of claim 15, wherein the method further comprises predicting an outcome based on a trained model, a set of inputs for the prediction and a result of a class or unknown.

17. The method of claim 11, further comprising accepting via an authentication interface a biometric input and returning an indication of known or unknown to a requesting entity.

18. The method of claim 17, wherein the requesting entity includes any one or more of: an application, a mobile application, a local process, a remote process, a method, and a business object.

19. The method of claim 11, wherein the method further comprises processing different types of biometric information using multiple classification networks.

20. The method of claim 11, wherein the method further comprises generating an identity of a person responsive to at least two probable biometric indicators, wherein the at least two probable biometric indicators are evaluated as part of a voting algorithm.

* * * * *